(12) United States Patent
Kirovski et al.

(10) Patent No.: US 8,788,848 B2
(45) Date of Patent: Jul. 22, 2014

(54) OPTICAL DNA

(75) Inventors: Darko Kirovski, Kirkland, WA (US);
Estrada T. Colon, Seattle, WA (US);
David L. Lewis, Seattle, WA (US);
Thomas Patrick Powell, Mukilteo, WA (US); Deepak Vijaywargiay, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 567 days.

(21) Appl. No.: 11/689,741

(22) Filed: Mar. 22, 2007

(65) Prior Publication Data

US 2008/0273435 A1     Nov. 6, 2008

(51) Int. Cl.
*G06F 11/30*     (2006.01)

(52) U.S. Cl.
USPC ........... 713/193; 382/100; 713/176; 380/277; 369/275.5; 714/723

(58) Field of Classification Search
USPC .................. 713/193, 176; 382/100; 380/277; 369/275.5; 714/723, 6
See application file for complete search history.

(56) References Cited

U.S. PATENT DOCUMENTS

| 5,295,187 | A | 3/1994 | Miyoshi |
| 5,572,589 | A | 11/1996 | Waters et al. |
| 5,984,366 | A | 11/1999 | Priddy |
| 6,249,606 | B1 | 6/2001 | Kiraly |
| 6,374,402 | B1 | 4/2002 | Schmeidler et al. |
| 6,567,914 | B1 * | 5/2003 | Just et al. .................. 713/160 |
| 6,571,193 | B1 | 5/2003 | Unuma |
| 6,606,412 | B1 | 8/2003 | Echigo |
| 6,668,015 | B1 * | 12/2003 | Kranawetter et al. ..... 375/240.12 |
| 6,668,325 | B1 | 12/2003 | Collberg et al. |
| 6,747,930 | B1 | 6/2004 | Weldon et al. |
| 6,807,548 | B1 | 10/2004 | Kemper |
| 7,003,131 | B2 * | 2/2006 | Watson et al. ................ 382/100 |
| 7,076,660 | B2 | 7/2006 | Newman |
| 7,356,172 | B2 | 4/2008 | Fan |
| 7,376,073 | B2 | 5/2008 | Hart, III et al. |

(Continued)

FOREIGN PATENT DOCUMENTS

| CA | 2434538 A1 | 10/2002 |
| JP | 2008-523537 A | 7/2008 |

(Continued)

OTHER PUBLICATIONS

Anand et al. (1997). A Flexible Security Model for Using Internet Content.*

(Continued)

*Primary Examiner* — Brian Shaw
(74) *Attorney, Agent, or Firm* — Steve Wight; Carole Boelitz; Micky Minhas

(57) ABSTRACT

The claimed subject matter relates to architectures and/or mechanisms that can facilitate issuing, embedding and verification of an optical DNA (o-DNA) signature. A first mechanism is provided for obtaining a set of manufacturing errors inherent in an optical media instance. These errors can be encoded into the o-DNA that can be cryptographically signed with a private key, then embedded into the source optical media instance. A second mechanism is provided that can decrypt the o-DNA with a public key and compare the authenticated errors to the observed errors to ascertain whether the optical media instance is authentic as opposed to a forgery or counterfeit.

23 Claims, 12 Drawing Sheets

(56) References Cited

U.S. PATENT DOCUMENTS

| | | |
|---|---|---|
| 7,451,439 B2 | 11/2008 | Nickell et al. |
| 7,596,778 B2 | 9/2009 | Kolawa et al. |
| 7,627,861 B2 | 12/2009 | Smith |
| 7,681,190 B2 | 3/2010 | Venkatesan et al. |
| 7,992,001 B2 | 8/2011 | Granados et al. |
| 8,239,967 B2 | 8/2012 | McMichael et al. |
| 2001/0018743 A1 | 8/2001 | Morishita |
| 2001/0033659 A1* | 10/2001 | Eisenberg ............... 380/203 |
| 2002/0026602 A1* | 2/2002 | Edelkind ................... 714/6 |
| 2002/0067674 A1 | 6/2002 | Schneck et al. |
| 2002/0084405 A1 | 7/2002 | Matsumoto et al. |
| 2002/0104071 A1 | 8/2002 | Charisius |
| 2002/0111997 A1 | 8/2002 | Herlihy |
| 2002/0114265 A1* | 8/2002 | Hart et al. ............. 369/275.5 |
| 2002/0136121 A1 | 9/2002 | Salmonsen et al. |
| 2002/0152436 A1* | 10/2002 | O'Dea ..................... 714/723 |
| 2002/0166096 A1 | 11/2002 | Shieh |
| 2002/0188566 A1 | 12/2002 | Inchalik et al. |
| 2003/0053656 A1* | 3/2003 | Levy ........................ 382/100 |
| 2003/0154376 A1* | 8/2003 | Hwangbo ................. 713/173 |
| 2004/0143742 A1 | 7/2004 | Muratani |
| 2004/0153941 A1 | 8/2004 | Muratani |
| 2004/0168025 A1 | 8/2004 | Carson |
| 2005/0008812 A1 | 1/2005 | Jackson et al. |
| 2005/0099612 A1 | 5/2005 | Kirovski |
| 2005/0108538 A1* | 5/2005 | Howard et al. ........... 713/176 |
| 2005/0180637 A1 | 8/2005 | Ikeda |
| 2005/0210255 A1* | 9/2005 | Kirovski .................. 713/176 |
| 2006/0013475 A1 | 1/2006 | Philomin |
| 2006/0123384 A1 | 6/2006 | Nickell et al. |
| 2006/0153052 A1 | 7/2006 | Meerwald et al. |
| 2006/0158976 A1* | 7/2006 | Fukunaga et al. ........ 369/44.34 |
| 2006/0190800 A1 | 8/2006 | Sollish et al. |
| 2006/0241999 A1 | 10/2006 | Tsyganskiy et al. |
| 2006/0242197 A1 | 10/2006 | Tsyganskiy |
| 2007/0234058 A1 | 10/2007 | White |
| 2007/0280095 A1 | 12/2007 | Yoshida et al. |
| 2007/0285419 A1 | 12/2007 | Givon |
| 2008/0125678 A1 | 5/2008 | Breen |
| 2008/0137848 A1 | 6/2008 | Kocher et al. |
| 2008/0172560 A1* | 7/2008 | Hughes et al. ........... 713/176 |
| 2008/0172686 A1 | 7/2008 | Selinfreund |
| 2008/0252463 A1 | 10/2008 | Andrechak et al. |
| 2008/0263366 A1 | 10/2008 | Mauruthi |
| 2008/0273435 A1 | 11/2008 | Kirovski et al. |
| 2009/0063867 A1 | 3/2009 | Granados et al. |
| 2009/0063868 A1 | 3/2009 | Granados et al. |
| 2009/0085864 A1 | 4/2009 | Kutliroff |
| 2009/0150296 A1 | 6/2009 | Kirovski et al. |
| 2009/0158044 A1 | 6/2009 | Kirovski |
| 2009/0183263 A1 | 7/2009 | McMichael et al. |
| 2009/0196140 A1 | 8/2009 | Yamaoka et al. |
| 2009/0202071 A1 | 8/2009 | Kato |
| 2009/0222799 A1 | 9/2009 | Stewart |
| 2009/0276762 A1 | 11/2009 | Ponitsch |
| 2010/0077380 A1 | 3/2010 | Baker et al. |
| 2010/0197390 A1 | 8/2010 | Craig |
| 2010/0214894 A1 | 8/2010 | Kirovski |
| 2011/0002209 A1 | 1/2011 | Kirovski |
| 2011/0083118 A1 | 4/2011 | Moore |
| 2011/0138362 A1 | 6/2011 | Keidar-Barner et al. |
| 2012/0163723 A1 | 6/2012 | Balan |
| 2012/0167061 A1 | 6/2012 | Kirovski |
| 2012/0214954 A1 | 8/2012 | Kirovski |

FOREIGN PATENT DOCUMENTS

| | | | |
|---|---|---|---|
| WO | 9743853 A1 | 11/1997 | |
| WO | 02082429 A3 | 10/2002 | |
| WO | 2004072782 A2 | 2/2004 | |
| WO | WO2004057580 (A2) | 7/2004 | |
| WO | WO 2004072782 A2 * | 8/2004 | |
| WO | 2006/064412 A1 | 6/2006 | |
| WO | WO2008116162 (A1) | 9/2008 | |

OTHER PUBLICATIONS

International Search Report and Written Opinion for PCT Application PCT/US2008/057842, dated and mailed Jun. 27, 2008, 10 pages.

U.S. Appl. No. 12/497,571, filed Jul. 3, 2009, Kirovski, et al.

U.S. Appl. No. 12/695,152, filed Jan. 27, 2010, Darko Kirovski, "Optical Medium with Added Descriptor to Reduce Counterfeiting".

Brodkin, John, "Software Revenue to Rise 8% in 2008, Gartner Predicts," retrieved at <<http://www.networkworld.com/news/2008/021408-gartner-software-revenue-2008.html>>, Network World, Feb. 14, 2008, 3 pages.

Dejean, et al., "RF-DNA: Radio-Frequency Certificates of Authenticity," retrieved at <<http://research.microsoft.com/en-us/um/people/darkok/papers/ches.rfcoa.pdf>>, Cryptographic Hardware and Embedded Systems, 2007, 14 pages.

DVD Technology Training, part 1, DVD Format & Process Training, Vencil Wells, AudioDev AB, Malmo, Sweden, pp. 1-31, date unknown.

DVD Technology Training, part 1, DVD Parameter Training, Vencil Wells, AudioDev AB, Malmo, Sweden, pp. 1-51, date unknown.

"Entertainment Software Association, Industry Facts," retrieved at <<http://www.theesa.com/facts/index.asp>>, The Entertainment Software Association, 2009, 1 page.

Finn, David, "How Technology Can Help in Fighting Counterfeiting and Piracy," Third Global Congress on Combating Counterfeiting and Piracy, Geneva, Jan. 2007, available at <<http://www.ccapcongress.net/archives/Geneva/Files/Finn.pdf>>, 10 pages.

Friedlander, Joshua P., "RIAA 2008 Year-End Shipment Statistics," retrieved at <<http://76.74.24.142/D5664E44-B9F7-69E0-5ABD-B605F2EB6EF2.pdf>>, Recording Industry Association of America, 2008, 2 pages.

Hefflinger, Mark, "Report: DVD Sales Drop 5.5% in 2008," retrieved at <<http://www.dmwmedia.com/news/2009/01/08/report:-dvd-sales-drop-5.5%25-2008%3B-blu-ray-threefold>>, Digital MediaWare Daily, Jan. 8, 2009, 4 pages.

"IEEE P1363a / D4 (Draft Version 4), Standard Specifications for Public Key Cryptography: Additional Techniques," IEEE, Piscataway, NJ, 2000, 78 pages.

Jablon, David, "IEEE 1363-2000: Standard Specifications For Public Key Cryptography," retrieved at <<http://csrc.nist.gov/groups/ST/toolkit/documents/kms/p1363%20(b-w).pdf>>, NIST Key Management Workshop, Nov. 1-2, 2001, 26 pages.

Jonker, et al., "Digital Rights Management in Consumer Electronics Products," IEEE Signal Processing Magazine, vol. 21, Issue 2, Mar. 2004, accessible at <<http://ieeexplore.ieee.org/stamp/stamp.jsp?tp=&arnumber=1276116&isnumber=28554>>, pp. 82-91.

Kaliski, Burt, "IEEE P1363: Standard Specifications for Public-Key Cryptography," retrieved at <<http://grouper.ieee.org/groups/1363/P1363/presentation/P1363-Presentation-8-17-99.pdf>>, Aug. 17, 1999, 45 pages.

Kirovski, Darko, "A Point-Set Compression Heuristic for Fiber-Based Certificates of Authenticity," retrieved at <<http://research.microsoft.com/en-us/um/people/darkok/papers/coadcc.pdf>>, Proceedings of the Data Compression Conference, 2005, 10 pages.

Kirovski, Darko, "Optical DNA V2.0," retrieved at <<http://temple.birs.ca/~09w5056/Optical%20DNA%20-%20BIRS%202009%20--%20upload.pdf>>, retrieved on Jan. 25, 2010, 15 pages.

Magiera, March, "Worldwide Packaged Media Up 6% in 2008," retrieved at <<http://www.videobusiness.com/article/CA6631456.html>>, Video Business, Jan. 21, 2009, 3 pages.

"Postscribed ID," retrieved at <<http://www.sonydadc.com/opencms/opencms/sites/am/Digital_Services/PID.html>>, Sony DADC, Sony Corporation, Tokyo, Japan, retrieved on Dec. 10, 2009, 1 page.

"Postscribed ID Technical Factsheet," retrieved at <<http://www.n-cd.com/ncdfiles/factsheet_PIDSpecs_2009_03_18.pdf>>,Sony Corporation, Tokyo, Japan, Mar. 2009, 4 pages.

(56) References Cited

OTHER PUBLICATIONS

Potlapally, Nachiketh, R., "Optical Fingerprinting to Protect Data: A Proposal," retrieved at <<http://ieeexplore.ieee.org/stamp/stamp.jsp?tp=&arnumber=993767&isnumber=21439>>, Computer, vol. 35, No. 4, Apr. 2002, pp. 23-28.
"Sixth Annual BSA-IDC Global Software 08 Piracy Study," Business Software Alliance, retrieved at <<http://global.bsa.org/globalpiracy2008/studies/globalpiracy2008.pdf>>, May 2009, 24 pages.
Slattery, et al., "Stability Comparison of Recordable Optical Discs-A Study of Error Rates in Harsh Conditions," retrieved at <<http://nvl.nist.gov/pub/nistpubs/jres/109/5/j95sla.pdf>>, vol. 109, No. 5, 2004, pp. 517-524.
"Standard ECMA-267, 120 mm DVD—Read-Only Disk," retrieved at <<http://www.ecma-international.org/publications/files/ECMA-ST/Ecma-267.pdf>>, 3rd Edition, Apr. 2001, 96 pages.
Tuyls, et al., "RFID-Tags for Anti-Counterfeiting," The Cryptographer's Track at the RSA Conference 2006, San Jose, CA, 2006, available at <<http://citeseerx.ist.psu.edu/viewdoc/download?doi=10.1.1.83.1586&rep=rep1&type=pdf>>, 17 pages.
Vijaywargi, et al., "Optical DNA," retrieved at <<http://fc09.ifca.ai/papers/95_optical_dna.pdf>>, Lecture Notes In Computer Science, vol. 5628, Financial Cryptography and Data Security: 13th International Conference, Feb. 23-26, 2009, 8 pages.
"Worldwide Video Game Sales Hit $32 Billion in 2008, Top DVD, Blu-Ray for First Time," retrieved at <<http://www.aol.co.nz/games/story/Worldwide-Video-Game-Sales-Hit-US32-Billion-in-'08-Top-DVD-Blu-ray-for-First-Time/1592561/index.html>>, Game Daily, Jan. 6, 2009, 1 page.
PCT International Search Report for Application No. PCT/US2008/057842 (corresponding to U.S. Appl. No. 11/689,741), mailed on Sep. 22, 2009, 5 pages.
PCT International Search Report & Written Opinion for Application No. PCT/US2010/040853 (corresponding to U.S. Appl. No. 12/497,571), mailed on Feb. 1, 2011, 9 pages.
Hou, et al.; "Three control flow obfuscation methods for Java software"; IEEE Proc.—Softw.; vol. 153, No. 2; Apr. 2006; pp. 80-86.
"Microsoft Financial Data At"; http://finance.yahoo.com; retrieved Dec. 10, 2009; 2 pages.
"Standard ECMA-335 Common Language Infrastructure (CLI) Partitions I to IV"; Dec. 2001; 440 pages.
"Standard ECMA-359 80 mm (1,46 Gbytes per side) and 120 mm (4,70 Gbytes per side) DVD Recordable Disk (DVD-R)"; Dec. 2004; 149 pages.
Tsai, et al.; "A Graph Approach to Quantitative Analysis of Control-Flow Obfuscating Transformations"; IEEE Transactions on Information Forensics and Security; vol. 4, No. 2; Jun. 2009; pp. 257-267.
Zhang et al.; "Hiding Program Slices for Software Security"; Apr. 2003; 12 pages.
Zhang, et al.; "Software Piracy Prevention: Splitting on Client"; International Conference on Security Technology; 2008; pp. 62-65.
Avdeev, "Three-Dimensional Electromagnetic Modelling and Inversion from Theory to Application", Surveys in Geophysics, May 26, 2005.
Barry, "Counterfeits and Counterfeiters: The Ancient World", Publicly Archived on Jan. 4, 2003.
Bellare, "The Exact Security of Digital Signatures—How to Sign with RSA and Rabin", Lecture Notes in Computer Science, 1996.
Born, "Principles of Optics—Electromagnetic Theory of Propagation, Interference and Diffraction of Light", Cambridge University Press, 1999.
"The 2000 CAD Benchmark Unveiled", Microwave Engineering Europe, Oct. 2000.
Sincerbox, "Counterfeit Deterrent Features for the Next-Generation Currency Design", Committee on Next-Generation Currency Design, Commission of Engineering and Technical Systems, 1993.
Clemens, "Discrete Electromagnetism with the Finite Integration Technique", Progress in Electromagnetics Research, 2001.
Collins, "RFID Fibers for Secure Application", RFID Journal, Mar. 26, 2004.
Dejean, "Making RFIDs Unique—Radio Frequency Certificates of Authenticity", IEEE Antennas and Propagation Society International Symposium, 2006.
Dey, "Circularly Polarized Meander Patch Antenna Array", IEEE Antennas and Propagation Society International Symposium, 1996.
Garcia, "On the Accuracy of the ADI-FDTD Method", IEEE Antennas and Wireless Propagation Letters, Feb. 18, 2002.
Haber, "Inversion of 3D Electromagnetic Data in Frequency and Time Domain Using an Inexact All-At-Once Approach", Society of Exploration Geophysicists, Sep. 2004.
Johnson, "The Elliptic Curve Digital Signature Algorithm (ECDSA)", Certicom Research, 1998.
Kirovski, "Toward and Automated Verification of Certificates of Authenticity", ACM Electronic Commerce, May 17-20, 2004.
Koblitz, "Elliptic Curve Cryptosystems", Mathematics of Computation, Jan. 1987.
Li, "Development and Analysis of a Folded Shorted-Patch Antenna with Reduced Size", IEEE Transactions on Antennas and Propagation, Feb. 2004.
Menezes, "Handbook of Applied Cryptography", CRC Press, 1996.
Michel, "EEG Source Imaging", International Federation of Clinical Neurophysiology, Jul. 28, 2004.
Namiki, "3D ADI-FDTD Method—Unconditionally Stable Time-Domain Algorithm for Solving Full Vector Maxwell's Equations", IEEE Transactions on Microwave Theory and Techniques, Oct. 2000.
Pappu, "Physical One-Way Functions", Doctoral Dissertation at Massachusetts Institute of Technology, Mar. 2001.
Pappu, "Physical One-Way Functions", Science Magazine, Sep. 20, 2002.
Rickard, "Asymptotic Convergence in the FDTD and TLM Methods", International Conference on Antennas, Radar, and Wave Propagation, 2005.
Rivest, "A Method for Obtaining Digital Signatures and Public-Key Cryptosystems", Communications of the ACM, Feb. 1978.
Shelby, "Experimental Verification of a Negative Index of Refraction" Science Magazine, Apr. 6, 2001.
Tsang, "Scattering of Electromagnetic Waves: Theories and Applications", 2000.
Veselago,"The Electrodynamics of Substances with Simultaneously Negative Values of εand μ" Soviet Physics Uspekhi, Jan. 1968.
Violino, "Firewall Protection for Paper Documents", RFID Journal, Feb. 11, 2004.
Xu, "Scattering by Rough Surface Using a Hybrid Technique Combining the Multilevel UV method with the Sparse Matrix Canonical Grid Method", Radio Science, Aug. 19, 2005.
Yee, "Numerical Solution of Initial Boundary Value Problems Involving Maxwell's Equations in Isotropic Media", IEEE Transactions on Antennas and Propagation, 1966.
Higo, "Refactoring Support Based on Code Clone Analysis"; Proceedings of the Fifth International Conference on Product Focused Software Process improvement, Apr. 5-8, 2004.
Guerra, "Refactoring Test Code Safely", Proceedings of the Second International Conference on Software Engineering Advances, Aug. 25-31, 2007.
Sommeriad, "Retaining Comments when Refactoring Code", Companion to the 23rd Annual ACM SIGPLAN Conference on Object-Oriented Programming, Systems, Languages, and Applications, OOPSLA 2008, Oct. 19-23, 2008.
CN Notice on the First Office Action for Application No. 201080031040.2, Nov. 5, 2012.
CN Notice on the Second Office Action for Application No. 201080031040.2, Jan. 14, 2013.
CN Notice on the Third Office Action for Application No. 201080031040.2, Apr. 24, 2013.
Forbes, "An Efficient Search Algorithm for Motion Data Using Weighted PCA", Proceedings of the ACM SIGGRAPH/Eurographics Symposium on Computer Animation, Jul. 29-31, 2005.
Friedman, "Additive Logistic Regression: A Statistical View of Boosting", The Annals of Statistics, Apr. 2000.
Inoue, "Fuzzy Support Vector Machines for Pattern Classification", Proceedings of the International Joint Conference on Neural Networks, Jul. 15-19, 2001.

(56) References Cited

OTHER PUBLICATIONS

Murphy, "Object Detection and Localization Using Local and Global Features", Lecture Notes in Computer Science, Oct. 2006.

PCT International Search Report and Written Opinion for Application No. PCT/US2012/024787, Reference 331393-02, Oct. 10, 2012.

Zhang, "Three-Dimentional Unilateral Method for the Bilateral Measurement of Condylar Movements", Journal of Biomechanics, Aug. 1995.

Japanese Patent Office, JP 2012-519608 filed Jul. 2, 2010, Office Action dated Nov. 26, 2013.

U.S. Appl. No. 12/389,611, filed Feb. 20, 2009.
U.S. Appl. No. 12/695,152, filed Jan. 27, 2010.
U.S. Appl. No. 12/497,571, filed Jul. 3, 2009.
U.S. Appl. No. 12/979,933, filed Dec. 28, 2010.
U.S. Appl. No. 13/030,154, filed Feb. 18, 2011.

* cited by examiner

| Disk 1 - Type A | Read 1 | Read 2 | Read 3 | Read 4 |
|---|---|---|---|---|
| Original | 0.014523 | 0.014272 | 0.014471 | 0.014215 |
| L1 (Level 1 Scratch) | 0.023189 | 0.023908 | | |
| L2 (Level 2 Scratch) | 0.032097 | 0.032024 | | |
| L3 (Level 3 Scratch) | 0.217765 | 0.216509 | | |
| High Frequency | 0.040604 | 0.082712 | 0.06244 | |

| Disk 2 - Type A | Read 1 | Read 2 | Read 3 | Read 4 |
|---|---|---|---|---|
| Original | 0.014788 | 0.014244 | 0.014684 | 0.014601 |
| L1 (Level 1 Scratch) | 0.013742 | 0.014096 | | |
| L2 (Level 2 Scratch) | 0.016401 | 0.016873 | | |
| L3 (Level 3 Scratch) | 0.112672 | 0.110944 | | |
| High Frequency | 0 | 0.00243 | 0.05664 | 0.0008 |

| Disk 3 - Type A | Read 1 | Read 2 | Read 3 | Read 4 |
|---|---|---|---|---|
| Original | 0.024788 | 0.023907 | | |
| L1 (Level 1 Scratch) | 0.020238 | 0.021118 | | |
| L2 (Level 2 Scratch) | 0.056482 | | | |
| L3 (Level 3 Scratch) | 0.101528 | | | |
| High Frequency | 0.056467 | 0.009098 | 0.002532 | 0.01072 |

FIG. 10

OPTICAL DNA

BACKGROUND OF THE INVENTION

Optical media such as a Compact Disc (CD) or Digital Versatile Disc (DVD) as well as the associated hardware to read the optical media are very commonplace. Given that a typical single sided DVD can achieve a mere $10^{-13}$ dollars per bit stored, optical media represents, by far, the most cost-effective means for storing information today. Accordingly, optical media is perhaps the most widespread means of proliferating protected content optical media is also a primary target of fraudulent third parties such as pirates, forgers, or counterfeiters because no good way of detecting counterfeited optical media exists.

Fraudulent activity can be distinguished, for example, for "piracy" vis-à-vis "counterfeiting". Piracy relates to the situation in which a purchaser is confident that the purchased object is not genuine due to an uncharacteristically low price. However, the willingly executes the transaction. Such transactions do not typically translate into substantial revenues to the pirate, since the low transaction price is normally well below the market price for an authentic object. Counterfeiting relates to a situation in which the seller defrauds the buyer into believing that the merchandise is authentic and collects the full market price for the product. In this case, the counterfeiter collects substantial revenue with profit margins typically higher than that of the original manufacturer due to lack of research and development, marketing costs, and so on.

According to Interpol, World Customs Organization and International Chamber of Commerce estimates that roughly 7-8% of world trade every year is in counterfeit goods. In particular, Glaxo-Smith-Kline in a study with the U.S. Food and Drug Administration estimated that counterfeit drugs account for 10% of the global pharmaceuticals market, while the Business Software Alliance (BSA) estimates that a staggering 36% of software sales worldwide are counterfeit. In addition, according to BSA, the Motion Picture Associate of America, the Recording Industry Association of America, and the International Federation of the Phonographic Industries, losses in the software, music, and movies industries due to counterfeiting far surpass the one billion dollar mark.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises an architecture that can issue an "optical DNA" (o-DNA) signature to facilitate authentication of optical media. In accordance with one aspect of the claimed subject matter, the architecture can provide a mechanism for examining an optical media instance in order to ascertain the positions of certain manufacturing errors inherent in all optical media. These error positions can be encoded into a fingerprint and cryptographically signed with a private key of an issuer to produce the o-DNA signature.

In accordance with another aspect of the claimed subject matter, the o-DNA signature can be embedded into the corresponding optical media instance. Thus, the optical media instance can include the manufacturing errors from which the error fingerprint was derived as well as the signed version of the fingerprint. Accordingly, the optical media instance can be distinguished from other optical media instances (e.g., counterfeit optical media instances) based upon the physical topology of the optical media instance relative to a digitally signed error fingerprint that is known to be authentic (e.g. the o-DNA).

In another aspect of the claimed subject matter, an architecture can be provided to verify the o-DNA signature in order to facilitate authentication of the optical media instance. For example, the architecture can provide a mechanism for reading the o-DNA signature from an optical media instance. The o-DNA can be decrypted and or verified as originating from a valid entity (e.g., based upon signing with the issuer's private key). In addition, the architecture can also receive error data actually observed from the optical media instance and compare the error data with the signed error fingerprint included in the o-DNA.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

BRIEF DESCRIPTION OF THE DRAWINGS

FIG. 10 depicts an exemplary table that illustrates error scanning results obtained from reading errors from four different optical media instances with three different types of contents.

DETAILED DESCRIPTION

Figure 1:
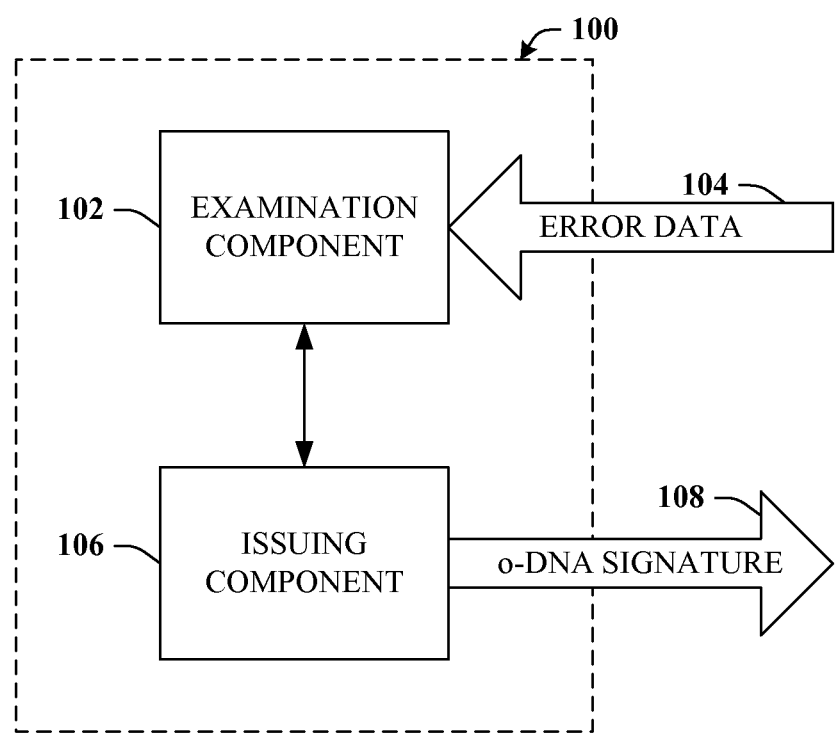
FIG. 1 illustrates a block diagram of a system that can issue an optical DNA (o-DNA) signature to facilitate authentication of optical media.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawing, with reference initially to FIG. 1, a system 100 that can issue an optical DNA (o-DNA) signature to facilitate authentication of optical media is depicted. Generally, the system 100 can include an examination component 102 that can receive error data 104 associated with an optical media instance (not shown). For example, due to a wide variety of factors, many of which are discussed infra in connection with FIG. 2, the manufacture of an optical media instance (e.g., a compact disc (CD) or digital versatile disc (DVD)) inevitably results in a number of manufacturing errors extant on each optical media instance. Conventional hardware suitable for reading a particular optical media instance (e.g. a CD or DVD player) is capable of detecting these manufacturing errors, but the end-user is normally unaware of the errors because the hardware can perform error-correction procedures on-the-fly to reconstruct data payloads (e.g., the content stored on the optical media instance), and deliver error-free payloads despite of the presence of manufacturing errors.

With even the most highly advanced equipment today, the manufacturing errors are difficult if not impossible to eliminate or control. Moreover, given that error-correction is a much cheaper alternative to producing error-free optical media instances, should the technology and/or precision be developed to produce an error-free optical media instance, such technology would likely be utilized to, e.g. increase the storage capacity of the optical media until it is dense enough to introduce manufacturing errors that can be cost-effectively corrected with hardware and/or software resident on future media players, just as today's media players do. Accordingly, manufacturing errors associated with optical media instances exist today and are likely to remain irrespective of technological advances. Moreover, the manufacturing errors are virtually certain to be unique. Thus, a state-of-the-art manufacturing facility that produces DVDs for a popular film studio, or CDs or DVDs for a large software vendor will likely see a different set of manufacturing errors on each instance, even for those instances produced within a few moments of one another by the same manufacturing equipment.

As discussed, consumer-grade devices are capable of detecting extant manufacturing errors for a particular optical media instance (indeed, the detected errors are commonly employed for an error-correction process). Such error data 104 can be received and utilized by the examination component 102 in order to construct an error fingerprint associated with that particular optical media instance. Since the set of manufacturing errors for a particular optical media instance can be unique, the error fingerprint constructed by the examination component 102 can likewise be unique for any given optical media instance.

In accordance with an aspect of the claimed subject matter, the error fingerprint can be constructed based upon a count and/or relative locations of a given set of manufacturing errors extant on that particular optical media instance. It is to be appreciated, however, that not all manufacturing errors extant on a particular optical media instance need be employed to construct the error fingerprint. Rather, the error fingerprint can be limited to only errors on certain portions of the optical media instance and/or limited only to certain types of errors, such as, e.g., errors that occur within a given distance of a sequential or adjacent error, which is discussed in more detail, infra.

It is also to be appreciated that in some scenarios it can be beneficial to manage the size (e.g. number of bits) of the error fingerprint. Accordingly, the error fingerprint can be a fixed-length bit-string that represents all or a relevant portion of the manufacturing errors extant on an optical media instance. In addition, according to an aspect of the claimed subject matter, the error fingerprint can be compressed and/or optimized such that a substantially minimal number of bits are necessary to describe a relevant error, which is further described below.

The system 100 can also include an issuing component 106 that can be operatively coupled to the examination component 102. Irrespective of the manner employed by the examination component 102 to encode and/or represent the error fingerprint, the error fingerprint can be delivered to the issuing component 106. The issuing component 106 can generate an o-DNA signature 108 for the optical media instance based at least in part upon the error fingerprint.

It should be understood and appreciated that the o-DNA signature 108 can include information other than the error fingerprint such as a product ID associated with content stored in the optical media instance as well as other suitable data. In addition, the issuing component 106 can cryptographically sign the error fingerprint (and other message data) in a manner understood in the arts in order to generate the o-DNA signature 108. One example is to employ the Bellare-Rogaway Probabilistic Signature Scheme (PSS/PSS-R) for signing the message data included in the o-DNA signature 108. In accordance with an aspect of the claimed subject matter, the o-DNA signature 108 can be signed using a private key of an issuer, such as the issuer of the optical media instance or the content stored thereon.

Figure 3:
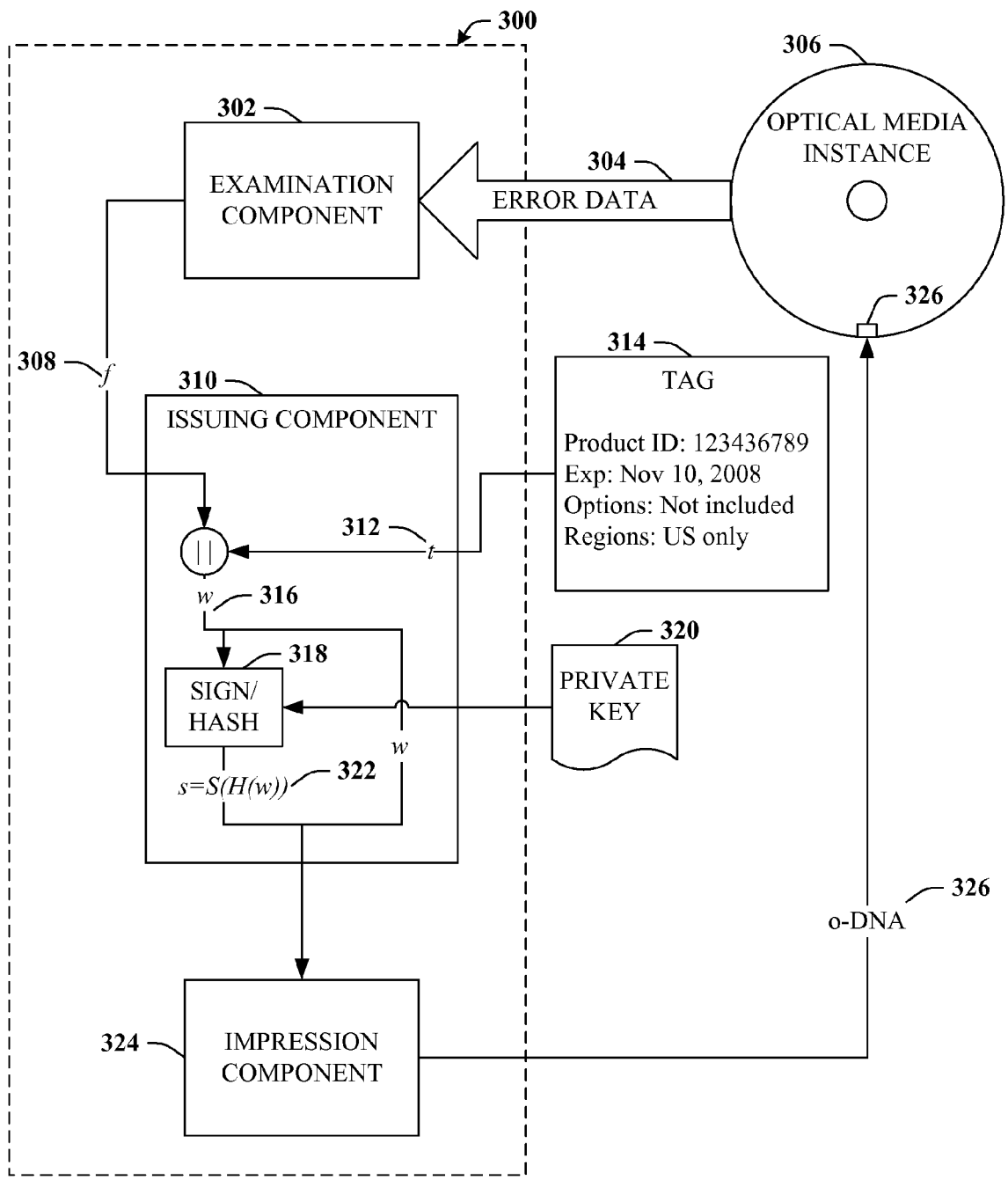
FIG. 3 is a block diagram an exemplary that can issue an o-DNA signature and embed the o-DNA signature in an optical media instance to facilitate authentication of optical media.

In addition, as will be detailed further in connection with FIG. 3, the o-DNA signature 108 can be embedded in the underlying optical media instance from which the error data 104 was received. The o-DNA signature 108 can be embedded as part of a post-production process known in the art or later developed, or as part of a standard write such as in the case of writable/re-writable optical media. Thus, the o-DNA signature 108 can serve as a mechanism that can uniquely identify and/or verify that the underlying optical media instance is authentic. For example, the multidimensional physical structure of the underlying optical media instance, and in particular the pattern of manufacturing errors, can effectively serve as a certificate of authenticity (COA), that can be verified and/or vouched for by the o-DNA signature 108.

By way of illustration, a COA is typically an inexpensive physical object that has a random and unique multidimensional structure, S, which is hard to near-exactly replicate. An inexpensive device should be able to scan the object's physical "fingerprint" in order to obtain a set of features in the form of a multidimensional signal, x, that pseudo-uniquely represents S. For a given fingerprint, x, and without access to S, it should be computationally difficult to construct an object of fixed dimensions with a fingerprint, y, which is at a bounded proximity from x according to a standardized distance metric. Thus, in accordance with the features and concepts described herein, it is to be appreciated that existing optical media instances can behave as COAs.

In addition, a COA can be employed to protect against forgery as well as other types of fraud. In accordance therewith, a COA can be a digitally signed physical object of fixed dimensions that has a random unique structure which satisfies the following requirements:

R1: The cost of creating and signing original COAs is small, relative to a desired level of security.

R2: The cost of manufacturing a COA instance is several orders of magnitude lower than the cost of exact or near-exact replication of the unique and random physical structure of this instance.

R3: The cost of verifying the authenticity of a signed COA is small, again relative to a desired level of security. One key to the analysis of COA instances is the extraction of its fingerprint (e.g., a set of features that reliably represents its multi-dimensional structure). This process is typically based on specific physical phenomenon and produces a cardinality-N vector of integers $x \in N^N$. This can impose that:

R4: It should be computationally difficult to construct an object of fixed dimensions with a fingerprint, y, such that $\|x-y\|<\delta$, where x is a given fingerprint of an unknown COA instance and $\delta$ bounds the proximity of x and y with respect to a standardized distance metric $\|\cdot\|$.

An additional requirement, mainly impacted by a desired level of usability, is that a COA should be robust to ordinary wear and tear. COA instances can be created in numerous ways. For example, when covering a surface with an epoxy substrate, its particles form a low-rise but random 3D landscape, which uniquely reflects light directed from a certain angle.

Figure 2:
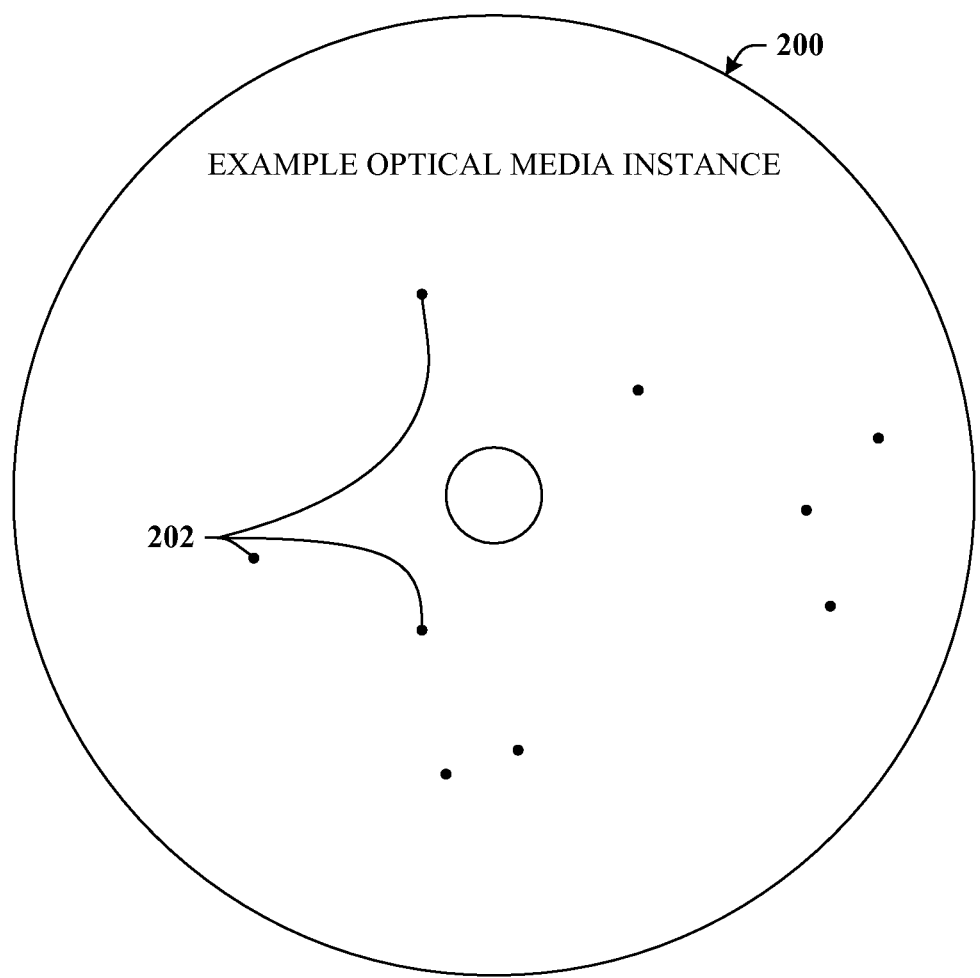
FIG. 2 is an exemplary optical media instance that includes a set of manufacturing errors.

Turning now to FIG. 2, an exemplary optical media instance 200 is illustrated. In general, the optical media instance 200 can be substantially any type of optical media including but not limited to the following formats, standards, and/or technologies: CD, CD-R, CD-RW, Laserdisc, Mini-Disc, Universal Media Disc (UMD), DVD, DVD±R, DVD±RW, DVD±R DL, DVD-RAM, Blu-ray Disc (BD), BD-R, BD-RE, High Density (HD) DVD, HD DVD-R, Ultra Density Optical (UDO), and so on. While the optical media instance 200 can be substantially any type of optical media format, example optical media instance 200, as well as other examples included herein, will be further detailed in the context of a standard DVD-R for the sake of brevity and clarity. Moreover, unless specified otherwise, the optical media instance 200 will be a single sided disc (e.g., DVD-5 or DVD-9) of the standard 120 mm (4.72 in.), although it is to be appreciated that double sided optical media instance 200 as well as other dimensions (e.g., 80 mm or 3.15 in.) are contemplated to be within the spirit and scope of the claimed subject matter.

Impression-based manufacturing of many types of optical media instance 200 is a well understood process with low variance of output produced within the same manufacturing facility; however, with possibly strong variance of output across different facilities—in particular for low quality manufacturing facilities. In order to provide addition context for the claimed subject matter, consider the following exemplary manufacturing process for a DVD-R disc.

DVD-R media is created using a high-speed automated replication process. Initial glass master of data to be used for disc creation is created by way of a photolithography process using a laser beam recorder to expose a photo resist coated blank glass master. For DVD-5 (e.g., single sided, single layer) a single glass master is required as data is wholly contained on one layer of the disc. For DVD-9 (e.g., single sided, dual layer), two glass masters must be created, one for each layer. The glass master is "developed" after exposure resulting in a pattern of bumps in the remaining photo resist. The glass master is typically nickel metal plated to create a "father", or a mirror image negative of the data created by the laser beam recording process on the glass master. The father is separated from the glass master and plated with nickel again to create a "mother" positive (e.g., the same as the original glass master). Each mother is again nickel plated to create a "stamper". The stamper is again a negative image of the original data (e.g., similar to the father) created by the laser beam glass mastering. One father can create 5 to 20 mothers, and a single mother can create up to 50 stampers. In turn, each stamper can create up to $10^5$ discs. The stampers are separated from the mother after plating, and then "punched" to correct outside diameter and correct hub hole inner diameter as required for the specific molding equipment used at the manufacturing plant.

The punched stamper is mounted inside the molding chamber of the manufacturing line. Molten polycarbonate (or some other optically clear, stable resin) is injected under pressure, heat and humidity into the mold chamber. The pattern of pits and lands on the stamper are impressed into the clear polycarbonate under up to several tons of pressure. The polycarbonate is rapidly cooled by way of chilled water flowing through the mold chamber housing, separated from the stamper and ejected from the mold chamber. This is considered a DVD half-disc, as it is one layer of the final DVD. At this stage, the disc is crystal clear and would not reflect a laser beam in a conventional DVD player.

For DVD-5 the following steps are then executed. Using a sputtering process, the ejected clear polycarbonate is plated with a layer of fully reflective material such as aluminum in order to reflect the laser beam in the DVD player. A clear half disc (no data stamped into the polycarbonate) is bonded onto the aluminum coated half disc creating a final disc 1.2 mm thick, with the data in the middle of the disc at approximately 0.6 mm from the bottom surface of the disc.

For DVD-9 the following steps are then executed. The bottom half of the disc is coated with a semi-reflective material that not only will reflect some of the laser beam in the DVD player, but will also allow the laser beam to pass through this layer. The top half disc is coated with aluminum to be fully reflective. The two half discs are bonded together such that the semi-reflective material and aluminum are facing each other at the bonding junction approximately 0.6 mm from the bottom of the disc.

In each of the steps above mechanical tolerances will be present. The degree of jitter and degree of run out in the original glass master will set a baseline for the final, finished discs as to the number of errors present. As each plating process to create the father, mothers, and stampers is executed, additional mechanical tolerances and microscopic differences will be introduced, again resulting in varying levels of intrinsic errors. Each stamper will have its own unique set of errors as a result of the tolerance of punching the stamper and mechanically mounting that stamper into a molding chamber.

Once the molding process begins sources of error are mechanical wear on the stamper. Given that a single stamper can create up to $10^5$ impressions, as each disc is stamped, the stamper wears, resulting in disc #1 of that stamper being different than disc #$10^5$ from that stamper. Moreover, if the line runs fewer than $10^5$ discs and then the stamper is removed and subsequently placed back into a mold chamber, the process of dismounting the stamper, handling, storing, and reinstalling the stamper will introduce additional mechanical tolerance changes.

Moreover, each disc created by the molding process is subject to the feed temperature of the polycarbonate, the heat, humidity, and pressure in the mold chamber, the quality of the polycarbonate, and how rapidly the polycarbonate is cooled. The mechanical handling of the separation from the stamper and transfer into the remaining processes can all introduce mechanical stresses and changes that will impact the final error signature of the disc. For example, the speed at which the polycarbonate cools and how rapidly the polycarbonate is pulled from the stamper will create changes in the shapes of the pits and lands, and these changes can result in errors.

In addition, the sputtering processes to apply either the semi-reflective material or the fully reflective aluminum can also have mechanical tolerances that will impact the thickness of the reflective material as well as the amount of reflectivity across the surface of the disc. Changes in reflectivity of the disc as it is scanned by the laser in the DVD player will impact the error rate of the disc. Bonding the two half discs together introduces potential differences in the run out of the two half discs. Finally the finishing of the label on the top surface of the disc can introduce mechanical stresses that create errors. All of these sources of mechanically induced differences in the finished disc will impact the error rate of the finished disc. In accordance therewith, the example optical media instance 200 can include a number of manufacturing errors, even when brand new and freshly off the production line, some of which are labeled with reference number 202.

Referring now to FIG. 3, an exemplary system 300 that can issue an o-DNA signature and embed the o-DNA signature in an optical media instance to facilitate authentication of optical media is depicted. Generally, the system 300 can include an examination component that can receive error data 304 associated with an optical media instance 306. The error data 304 can be, e.g. all or a portion of the manufacturing errors associated with the optical media instance 306, such as the errors 202 described in connection with FIG. 2. The error data 304 can include a count of relevant errors as well as information associated with the location for each of the relevant errors. The examination component 302 can construct a fingerprint 308 (denoted, f) based upon all or a portion of the error data 304. As described supra, the fingerprint 308 can be compressed and/or optimized to encode the error data 304 with a minimal number of bits per error, and, in addition, the fingerprint 308 can be a fixed-length bit string to, e.g., facilitate multi-system integrity.

The examination component 302 can transmit the fingerprint 308 to an issuing component 310, which can issue an o-DNA signature for the optical media instance 306 based at least in part upon the fingerprint 308. According to one aspect of the claimed subject matter, the issuing component 310 can concatenate the fingerprint 308 with tag data 312 (denoted, t) obtained from a tag 314. Tag 314 is depicted to include a product ID associated with data included on the optical media instance 306; an expiration date (e.g., associated with a digital certificate or the like); options; and available regions (e.g., information associated with media players and/or encoding schemes for the data). However, it is to be appreciated that tag 314 is merely exemplary, and could include other suitable data. Likewise, tag 314 need not include some or all the depicted fields. Regardless, tag data 312, which can be all or a portion of the data included in the tag 314 can be concatenated with the fingerprint 308 to create a combined bit-string 316 (denoted w). Hence, w can be f||t.

The combined bit-string 316 can be supplied to a signature component 318, where the combined bit-string 316 can be cryptographically signed (denoted S) and/or hashed (denoted H) based upon any suitable means. According to an aspect of the claimed subject matter, the signature component 318 can employ a private key associated with an issuer (described in more detail infra). Accordingly, the signature component 318 can output a signature 322 (denoted s) that can be substantially, s=S(H(w)). The signature 322 as well as (optionally) the combined bit-string 316 can be comprise the information that represents the o-DNA signature 326, that can, e.g. uniquely identify the optical media instance 306. In addition, the signature 322 (and the combined bit-string 316) can be supplied to an impression component 324, which can embed the o-DNA signature 326 in the optical media instance 306.

Since the o-DNA signature 326 is unique and based upon correspondingly unique physical properties associated with the optical media instance 306, embedding the o-DNA signature 326 in the optical media instance 306 can thus facilitate verification that the optical media instance 306 is authentic. It is to be appreciated that the impression component 324 can embed the o-DNA signature 326 in a variety of ways. With, for example, a standard DVD±RW disc, the o-DNA signature 326 can be written to the disc with conventional DVD players (with write capabilities) prior to finalizing and/or completing a table of contents for the disc. As another example, with a standard DVD-R disc (that is typically not editable), the o-DNA signature 326 can be embedded in the disc by employing a well-known post-production process that provides a mechanism for writing a certain number of bits to an optical media instance post-molding and bonding.

FIGS. 4-7 can present additional context for the claimed subject matter and are provided to aid in the understanding of what is disclosed herein. In particular, FIGS. 4-7 relate to additional aspects, features, and/or embodiments, or generally offer more detail or clarity with respect to the claims appended hereto, and are intended to be discussed in connection with FIG. 3. For example, as introduced supra, only a portion of the inevitable errors associated with the manufacture of an optical media instance 306 need be employed to create the fingerprint 308. Accordingly, the fingerprint 308 can be constructed (e.g. by the examination component 302) based upon an error model associated with well-known and/or standard means for detecting errors in the optical media instance 306.

Figure 4A:
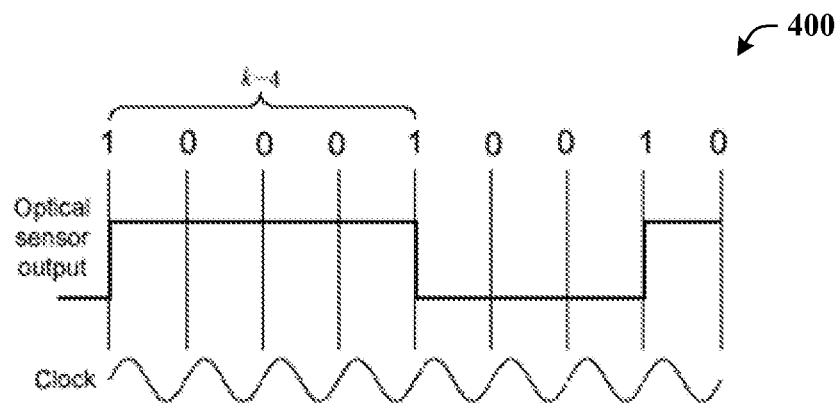
FIG. 4A illustrates a graphical representation of an example encoding of 100010010 utilizing a Non-Return to Zero, Inverted (NZRI) encoder.

Turning now to FIG. 4A, a graphic illustration of an example encoding 400 of 100010010 utilizing a Non-Return to Zero, Inverted (NZRI) encoder is shown. NZRI is a method of mapping a binary signal to a physical signal for transmission over some transmission media. The immediate output of the physical readout from a DVD-R consists of an NRZI-encoded signal clocked at 26.1 MHz. The signal is high or low depending on whether there is a pit or a land on the optical disk. The NRZI encoding is such that between two ones (e.g., a floor change signal) the signal stays at the same level for a certain number of clock cycles, k, where k is an integer $\in C$, where $C \equiv \{3, 4, 5, 6, 7, 8, 9, 10, 11, 14\}$. That is, the NRZI signal has a transition at a clock boundary if the bit being transmitted is a logical one, and does not have a transition if the bit being transmitted is a logical zero, and the number of clock cycles between two logical ones (e.g., floor changes) is valid for k.

As depicted, the first logical one changes the floor from low to high, where it remains for the next four (which is a valid k value) clock cycles, whereupon the second logical 1 signifies a change from high to low for the succeeding three clock cycles (also a valid k value), and so on. It is to be appreciated, however, that the example encoding 400 is an "ideal" representation. Conventionally, due to manufacturing inefficiencies, the distance between two signal floor changes is not always an exact multiple of the master clock cycle. Rather, the multiple can be a random variable, t, that can be represented as:

$$t_i = k_i + \Box(0, \sigma_M), k_i \in, \qquad (1)$$

where $\Box(0, \sigma_M)$, can denote a random zero-mean Gaussian variable with standard deviation equal to $\sigma_M$. Generally, it should be appreciated that high-quality manufacturing should have relatively low $\sigma_M$. It can be assumed that the legal publisher of protected DVDs and other optical media instances 306 will use state-of-the-art manufacturing, and therefore that it would be a considerable challenge to achieve significantly better error rates by an adversarial manufacturing process. Accordingly, an exemplary error model can be postulated as follows:

(i) The probability that a signal with $½-\epsilon < |t_i-k_i| < ½$ is incorrect, is 0.5.
(ii) The probability that a signal with $½-\epsilon \geq |t_i-k_i|$ is incorrect, is 0.
(iii) The probability that a signal with $½+\epsilon \leq |t_i-k_i|$ is incorrect, is 1.

The probability model is likely to be smooth over $|t_i-k_i|$. In accordance therewith, the model can be simplified for two reasons: 1) it can be expected that the player decision will sharply (but smoothly) change for a specific $\epsilon$; and 2) all parameters need not be estimated for the model.

Figure 4B:
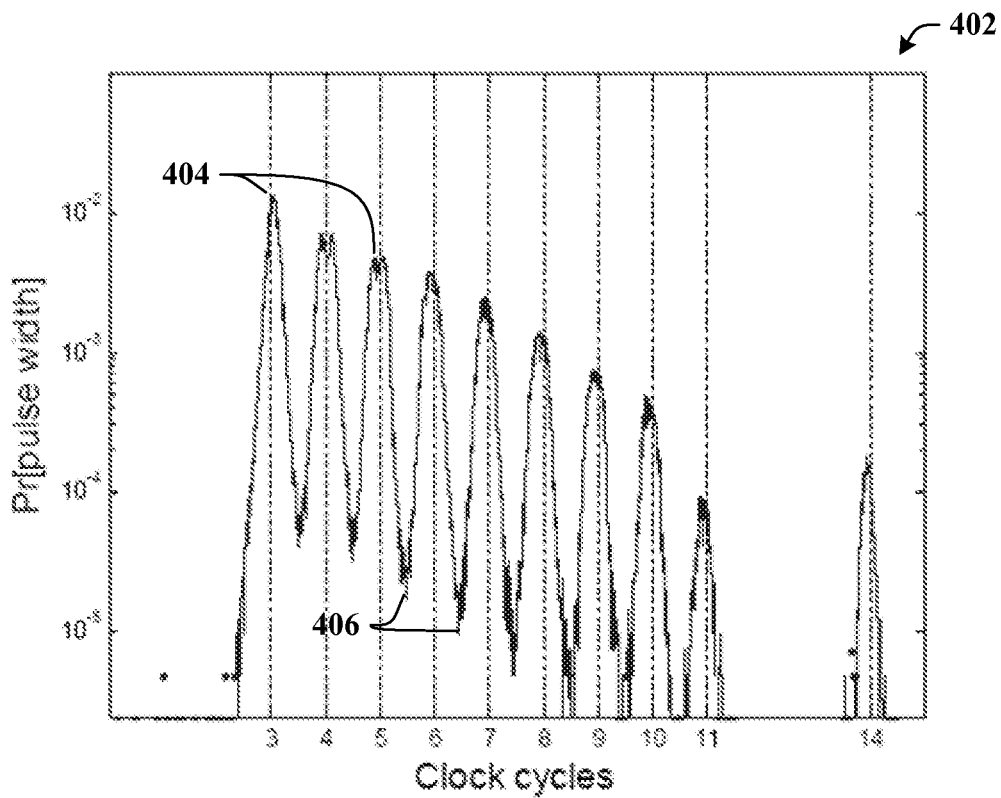
FIG. 4B depicts an exemplary graphical representation 402 of the distribution of pulse-widths.

Referring to FIG. 4B, an exemplary graphical representation 402 of the distribution of pulse-widths, $t_i$, is presented. The representation 402 is based upon reading over the 24$^{th}$ millimeter of a single high-quality DVD (e.g., optical media instance 302) with the installation data for a popular Integrated Development Environment (IDE). It is to be appreciated that other portions of the optical media instance 302 could be read and/or the optical media instance 302 could include other content as well without substantial changes to the representation 402. It is noteworthy to underscore that the pulse-width distributions tend to peak 404 at or near integer values (e.g. k) and tend to trough 406 mid-way between integer values. Thus, the probability that $t_i$ is close to an integer value is relatively high and conversely the probability that $t_i$ is half-way between two integers, is around two orders of magnitude lower.

Figure 5A:
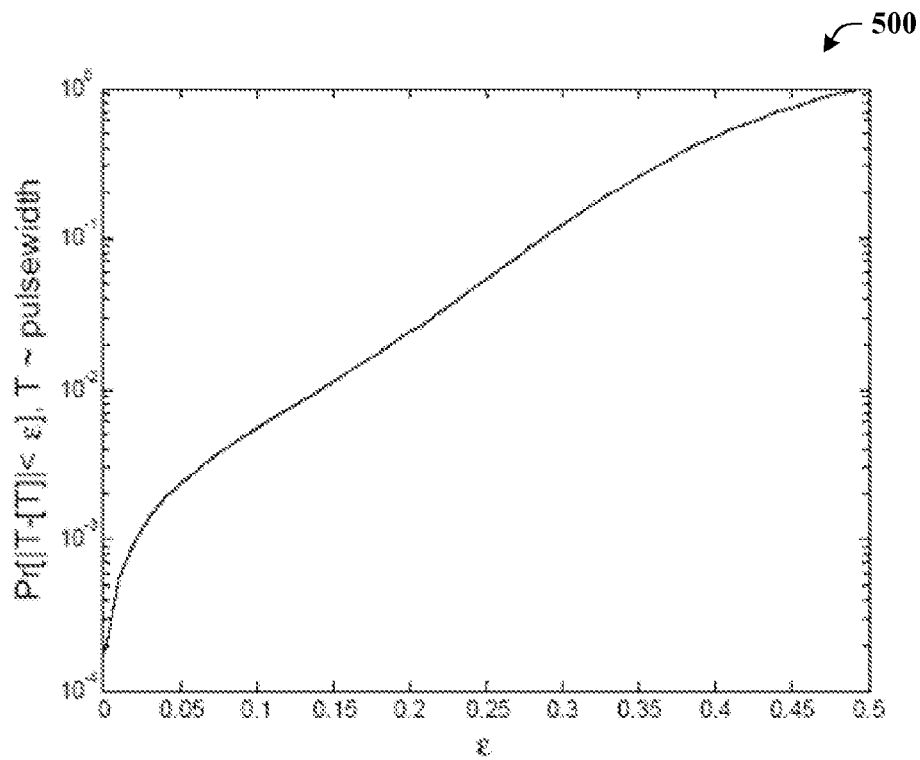
FIG. 5A is an exemplary graphic representation of a distribution of $||t_i-k_i|-0.5|$ over the $24^{th}$ millimeter of a high-quality DVD.

FIG. 5A illustrates an exemplary graphic representation 500 of a distribution of $||t_i-k_i|-0.5|$ over the 24$^{th}$ millimeter of a high-quality DVD. For example, to estimate the error rate, the distribution of $||t_i-k_i|-0.5|$ is over the same portions of the same optical media instance 302 used to plot the distribution in FIG. 4B. Such data can be obtained with a DVD player with an analog Transistor-Transistor Logic (TTL) output representing the NRZI encoded signal recorded at the output of the optical sensor in the DVD player. The TTL output was sampled at a rate of 10 Gsamples/sec to produce accurate statistics about $t_i$ for the optical media instance 302 under test. The graphical representation 500 illustrates that the likely error rate on the optical media instance 302, assuming an error threshold, $\epsilon \in [0.05, 0.1]$ and that the Pr[$½+\epsilon \leq |t_i-k_i|$]=0, is roughly on the order of $10^3$. This estimate can be employed to validate other results detailed infra.

The DVD-R standard utilizes an efficient codec for converting an alphabet, A, which consists of 16-bit symbols encoded using NRZI, into an alphabet, L, of 256 8-bit words. It should be underscored that not all 16-bit symbols belong to A. Thus, legal 16-bit symbols (e.g., those that belong to A) can be distinguished from illegal 16-bit symbols (e.g., those that do not belong to A), even though either symbol read from the optical media instance 302 can be the result of an error.

Figure 5B:
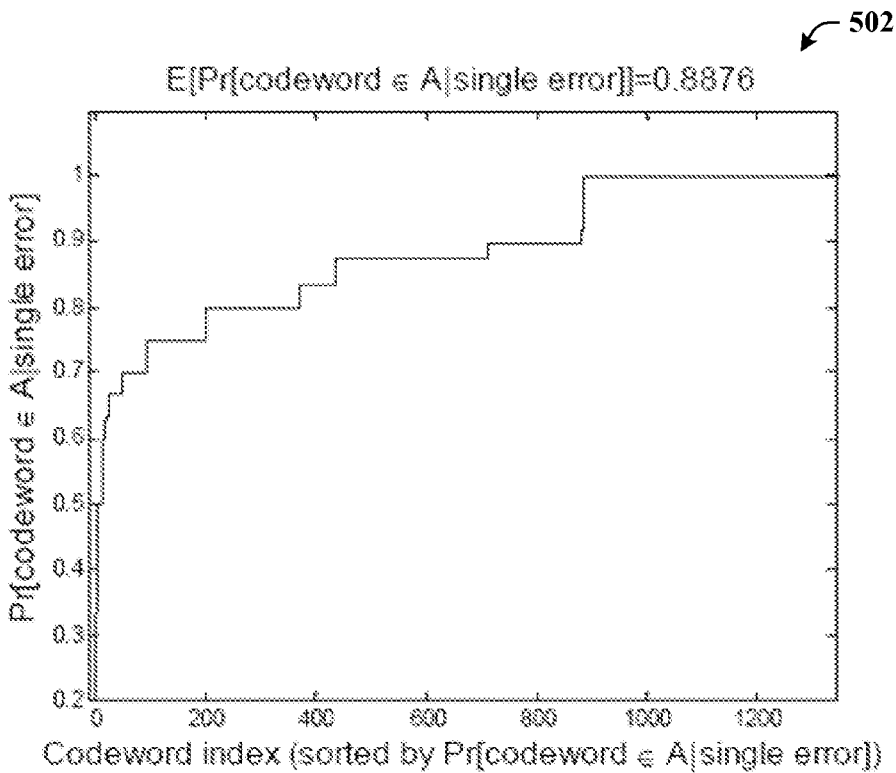
FIG. 5B depicts an exemplary graphical representation of the probability of an illegal symbol after an occurrence of a single-position error on a legal 16-bit symbol from A.

Referring now to FIG. 5B, an exemplary graphical representation 502 of the probability of an illegal symbol after an occurrence of a single-position error on a legal 16-bit symbol from A is depicted. For example, the graphical representation 502 illustrates the probability that a legal 16-bit keyword remains legal after the event of an arbitrary single position error. Since the probability of an error itself is relatively low, only the case in which a symbol from A is affected by a single error need be considered herein.

One can notice that the overall probability that a 16-bit symbol error cannot be found in the look-up table A→L, is roughly p=0.11. That means that although there exists an error on the optical disk, the likelihood that it will be detected during NRZI decoding is relatively low and equals p. However, such errors are detected accurately in higher levels of decoding.

The main synchronization primitive for low-level encoding in the DVD-R standard can be a cluster of 26 data fields. Each field can consist of a specific synchronization pattern (e.g., 32 NRZI-bits long) and a payload of 91 symbols from A (e.g., a 1456 NRZI-bits payload). The synchronization pattern can be a 32-bit synchronization symbol selected from a specific 32-symbol alphabet, S. Accordingly, the 38688-bit clusters can represent the main storage unit on an optical media instance 302 such as a DVD-R. A classification of the error types can be found in connection with FIG. 6.

Figure 6:
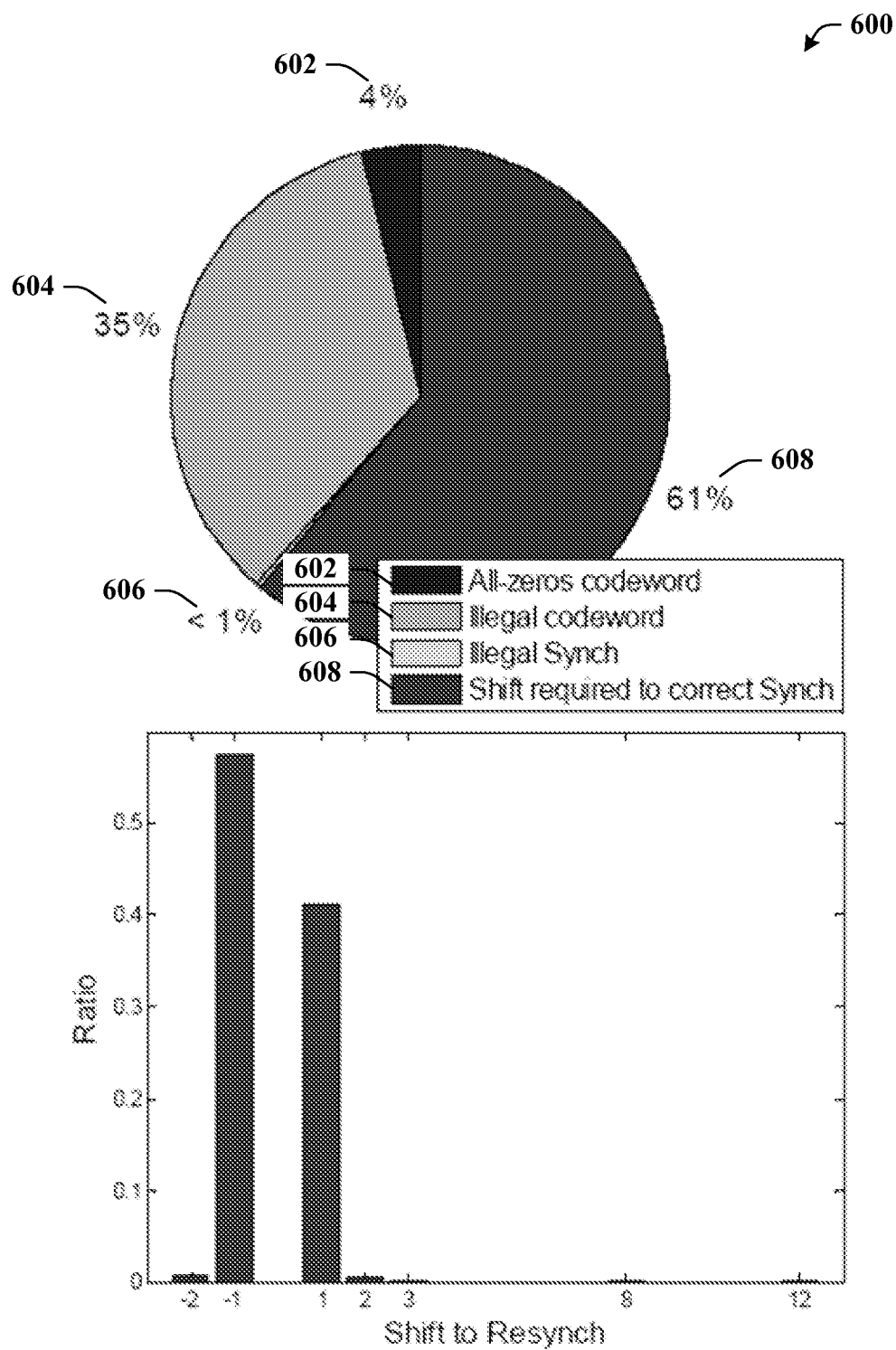
FIG. 6 is an exemplary graphical representation that includes an upper portion depicting a pie chart of percentages associated with each error type and a lower portion illustrating a number of shifts necessary for a re-synch.

Turning now to FIG. 6, an exemplary graphical representation 600 that includes an upper portion depicting a pie chart of percentages associated with each error type and a lower portion illustrating a number of shifts necessary for a re-synch is provided. The occurrence of each error type that was detected is again within the $24^{th}$ millimeter of a single DVD disk. In general, the error types that can occur can be summarized as follows:

(a) illegal codeword—a payload symbol is altered due to an error and the resulting codeword cannot be found in the set of legal words, A. An illegal codeword is labeled with reference numeral 604 and accounts for approximately one-third of the errors detected with low-level NRZI decoding.

(b) codeword still in A after error—a payload symbol is altered due to an error; the new symbol exists in A. These types of errors are not easily detectable with low-level decoding, and thus are not illustrated on the graphical representation 600

(c) shift required to correct a synchronizing symbol—errors commonly shift the synchronization symbols with respect to their correct position within a cluster. Typically, adjustment shifts for one or two positions are sufficient to realign the synchronization symbols. This error type is denoted with reference numeral 608 and accounts for nearly two-thirds of the detected errors.

(d) illegal synchronization codeword—a synchronization symbol is altered due to an error and the new code-word is not found in the set of legal synchronization codewords, S. This error type is indicated by reference numeral 606 and account for fewer than 1% of the errors.

(e) all zeroes codeword—all bits of a symbol equal zero. Such a symbol is not legal in either A or S. Accordingly, such a symbol can be provided special attention because it corresponds to a specific manufacturing error. An "all zeroes codeword" error is represented by reference numeral 602 and accounts for about 4% of the detected errors.

Again, since no Eight-to-Fourteen (EFM) decoding (e.g., higher level decoding) was employed, no errors of type (b) were detected. As mentioned earlier, the expectation is that the number of errors of type (b) is approximately 9 times greater than errors of type (a) (e.g., 89% versus 11%). The lower portion of the graphical representation 600 illustrates the probability that a shift of x integer positions re-synchs a synchronization codeword to its proper position once an error of type (c) (e.g., reference numeral 606) is detected. One can observe that virtually all errors of type (c) are such that a one-position shift (e.g., one position forward or one position backward) re-synchs the payload cluster.

Referring again to FIG. 3, it is to be appreciated that in addition to an error model and error classification employed, for example, for receiving the error data 304 and constructing the fingerprint 308, another noteworthy aspect of the examination component 302 can be compression of error positions of the manufacturing errors included in the error data 304. In particular, this aspect can be associated with the compression and/or optimization of the fingerprint 308, and can be more thoroughly explained in connection with FIG. 7.

Figure 7:
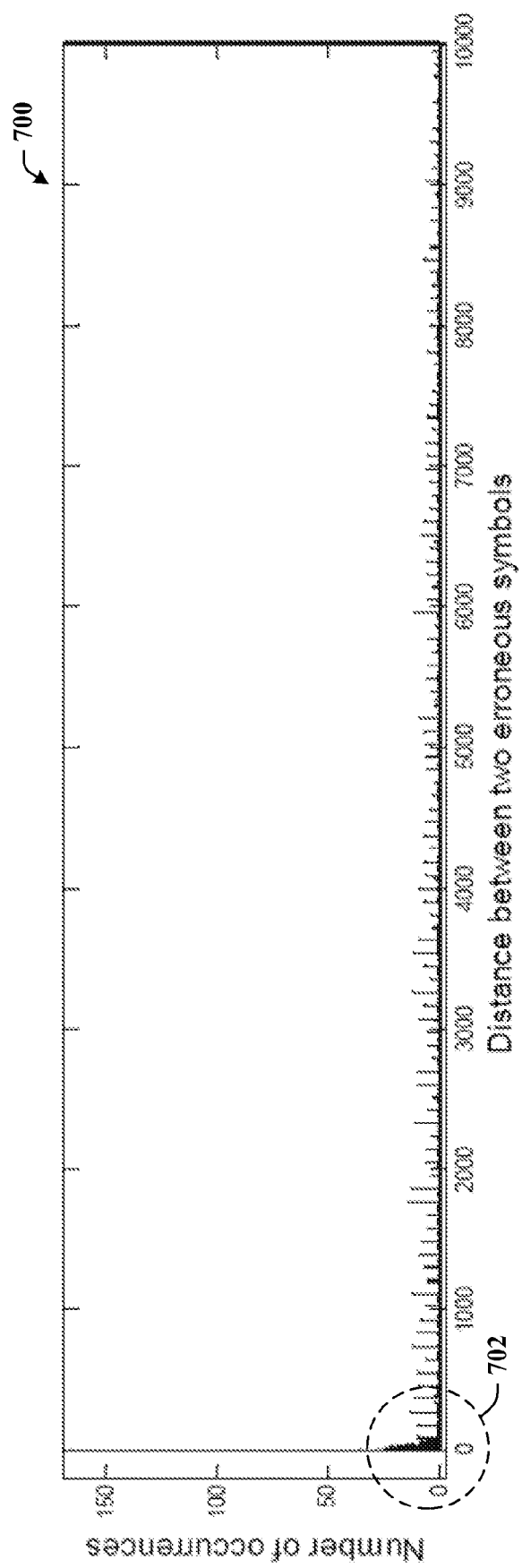
FIG. 7 depicts an exemplary graphical representation of a distribution of distances between two consecutive errors on a disc.

While still referencing FIG. 3, but turning also to FIG. 7, an exemplary graphical representation 700 of a distribution of distances between two consecutive errors on a disc (e.g., optical media instance 302). Yet again, data is presented for the $24^{th}$ millimeter of a single DVD disc. Distances are measured in terms of a number of 16-bit symbols that occur between each error. In particular, the distance between two consecutive error positions, $e_i$ and $e_{i+1}$, can be denoted as $d_i$. One can readily notice, and it is further highlighted by the reference circle 702 that the variable d over all collected error distances is concentrated in $1 \leq d \leq 92$, and at multiples of 93 symbols, which is the length of a single cell in a cluster (e.g., a synchronization codeword followed by 91 payload codewords).

In accordance therewith, the following selection-based encoding can be adopted, whereby only errors at a distance $d_E \equiv [1, 92] \cup 93k$ are compressed, where $k \in N^+$. Approximately 75% of all errors are represented by such a selection. Finally, the number of bits necessary to encode a single error position can be estimated. For example, the entropy of error distances over $d_E$ can be computed from the collected results, and it can be observed that an individual error location can be compressed using 7.72 bits, on the average.

Figure 8:
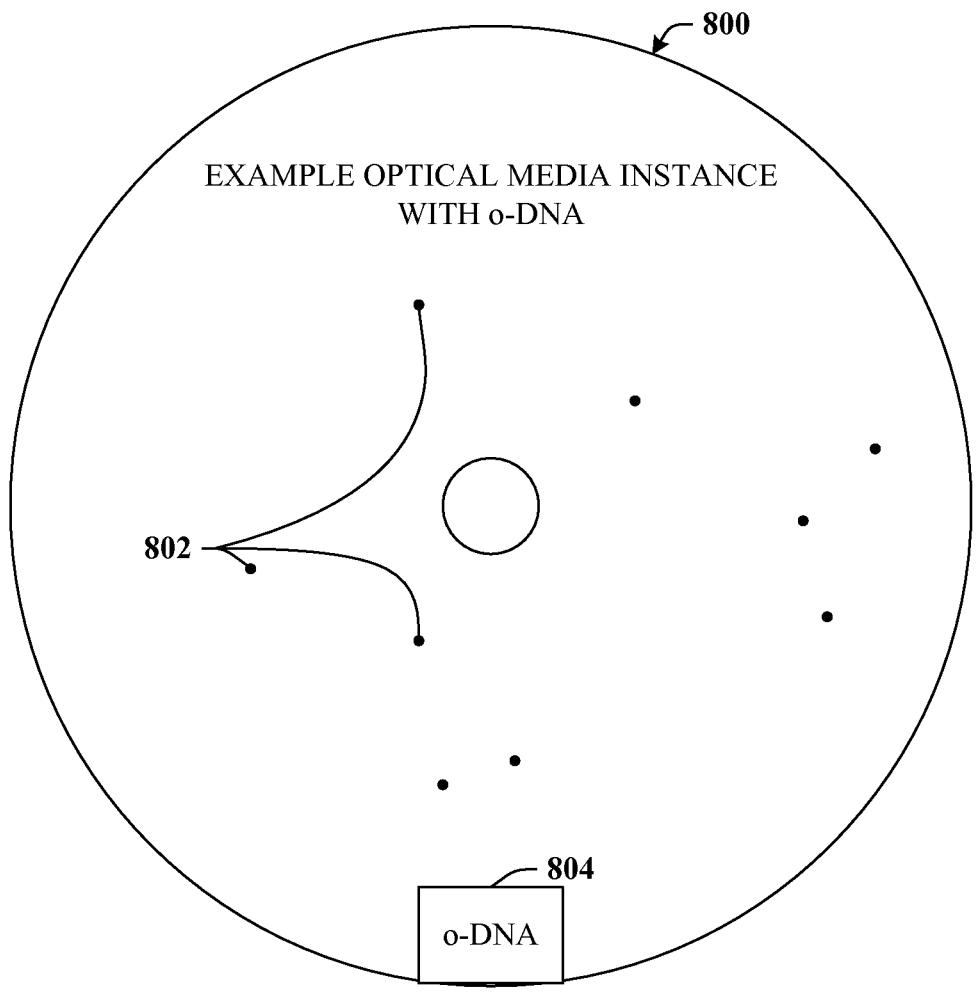
FIG. 8 illustrates an exemplary optical media instance with an o-DNA signature.

Referring now to FIG. 8, an exemplary optical media instance 800 with o-DNA is illustrated. In general, as with the optical media instances 200, 306 from FIGS. 2 and 3, respectively, the optical media instance 800 can include a set of manufacturing errors 802. The optical media instance 800 can also include an o-DNA signature 804 that can encode a pattern of a subset of the set of manufacturing errors 802 to facilitate authentication of the optical media instance 800. The o-DNA signature 804 can be cryptographically signed with a key, typically a private key, associated with an issuer.

The issuer can be, for example, an author or rights-holder of the content stored in the optical media instance 800 such as multimedia content (e.g., software applications, feature films, videos, music, or commentary to list but a few). In addition, the issuer can an authorized manufacturer of the optical media instance 800, or a third-party agent of the author, rightsholder, or manufacturer who can, e.g., employ a private key to sign the o-DNA signature 804 on behalf of the author, rightsholder, or manufacturer.

It is to be appreciated that optical media such as optical media instance 800 is the most cost-effective means for storing information today. A typical single sided DVD can achieve a mere $10^{-13}$ dollars per bit stored. As a result, optical media is indispensable for storing and purveying data. Likewise, optical media is also a primary target of fraudulent third parties such as pirates, forgers, or counterfeiters because heretofore, no good way of detecting counterfeited optical media existed. However, an advantage of including the o-DNA signature 804 is that the optical media instance 800 can be authenticated. Conversely, by including the o-DNA signature 804 on the optical media instance 800, non-authentic optical media can be detected. Moreover, the o-DNA signature 804, as described herein, can be a very low-cost mechanism for counterfeit deterrence in connection with such media that can be, further, cryptographically secure and predictably strong. The cost per optical media instance 800 of adding the o-DNA signature 804 is virtually zero for writable/rewritable optical media and negligent in most cases for optical media that is not writable.

Figure 9:
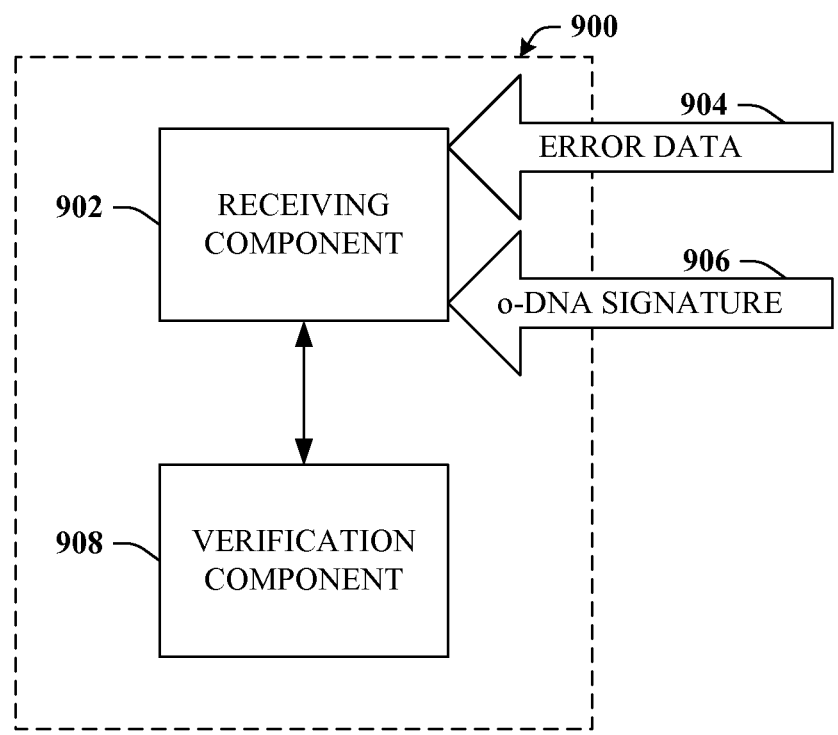
FIG. 9 is a block diagram of an exemplary system that can verify an o-DNA signature to facilitate authentication of optical media.

With reference now to FIG. 9, a system 900 that can verify an o-DNA signature to facilitate authentication of optical media is illustrated. Generally, the system 900 can include a receiving component 902 that can receive information read from an optical media instance (not shown) such as, for example, the optical media instance 800 from FIG. For example, the received information can include both error data 904 and an o-DNA signature 906. The error data 904 can relate to a count and/or respective positions of a set of manufacturing errors extant on the optical media instance. The o-DNA signature 906 can include a cryptographically signed composite bit-string comprising an error fingerprint, f, wherein the error fingerprint corresponds to manufacturing error data (e.g., error data 904) on an authentic optical media instance.

The system 900 can also include a verification component 908 operatively coupled to the receiving component 902. The verification component 908 can compare the o-DNA signature 906 to the error data 904 to, e.g., determine if the optical media instance is authentic. For example, if the o-DNA signature 906 includes a signature, s, signed with a private key of an issuer, the verification component 908 can decrypt the o-DNA signature 906 by employing a public key associated with the issuer. As described, the o-DNA signature 906 can also include the error fingerprint that is known to correspond to errors on an authentic optical media instance. If the error fingerprint is compressed, the verification component 908 can decompress the error fingerprint and compare the decompressed information with the error data 904 to determine if the subject optical media instance includes a substantially similar set of manufacturing errors.

While there are a number of potential scenarios, briefly, if the subject optical media instance (e.g., the source of the error data 904) maintains a high degree of similarity with the data included in the o-DNA signature 906 (e.g., error data from a known, authentic optical media instance), then the subject optical media instance can be deemed authentic. Otherwise, the subject optical media instance may be deemed to be counterfeit. The degree of similarity can be based upon a comparison metric, δ, that can be a predefined and statistically validated threshold. For example, δ can be defined based upon a variety of factors such as potential differences between media players/readers (e.g., the reader employed to construct the o-DNA signature 906 versus the reader that obtains the error data 904 for comparison), wear and tear or other degrading effects on the optical media, or the like.

In accordance therewith, it is readily apparent that the o-DNA signature 906 can be employed to facilitate counterfeit deterrence. For example, in the realm of software distribution, users are commonly given an optical media instance with a copy of protected software. The software could be Original Equipment Manufacturer (OEM) pre-installed on a computer as well. In either case, the user will likely believe that the copy is authentic but may desire to authenticate it. Additionally, during installation the software itself could ask the user to put the authentic optical media instance with an o-DNA signature 906 into a DVD player (or other device) that can host the verification component 904 as well as the system 900. The system 900 could respond to such according to the following four cases:

True positive—in which case the user can be assured that the copy is authentic. This data could be used to replace or complement existing product IDs.

True negative—the user can be notified (described infra in connection with FIG. 11) that the o-DNA is invalid. In this case, the issuer and/or copyright owner could provide incentives to users to report the results of this test, which can be performed in an automated fashion such that, e.g., the user need only agree to submit the information. It is to be appreciated that in most cases the likelihood that the copy is counterfeit should be very certain for this diagnosis.

False positive—this case means that a counterfeit copy has just passed the authentication test. An objective of the o-DNA signature 906 as well as other aspects described herein can be to mitigate false positives. Thus, the probability of a false positive should be small under versus an adversarial attack with bounded funding.

False negative—this case means that an authentic copy has been rendered as counterfeit. Here, the user might report this result to the issuer or copyright owner, including the identification of the software seller. While this might reflect detrimentally on the software seller, the overall ecosystem should be able to tolerate a relatively high likelihood of false negatives because copyright owners can choose to react only if they receive uncharacteristically high ratio of false negatives from a specific seller.

Similarly, the o-DNA signature 906 could be used by individual users who create recordable optical media or, as another example, by entertainment studios. In the first case, the user can produce DVDs (or other optical media instances) that can be authenticated to a recording device. In the second case, specific CD or DVD players (or other devices) could verify the authenticity of the optical media content, and can provide the user with a mechanism for reporting the results of the authentication test to the entertainment studios or other parties.

It is to be appreciated that conventional consumer-grade media players can read the low-level error data (e.g., error data 904), however, often this data is merely used for internal procedures such as error checking. Accordingly, if an existing player, while certain to be able to read error data 904, is not configured to store and/or transmit the error data 904 (e.g., to the receiving component 902), then a modification can be made to provide this functionality. For example, a minor modification to the Basic Input-Output System (BIOS) can facilitate such a feature. Moreover, based upon the aspects described herein, players manufactured in the future can be readily configured to persist the low-level error data 904.

Moreover, it should also be appreciated and understood that since some manufacturing errors can manifest as signals with pulse-widths far from integer clock values. While these errors tend to be less likely (see e.g. reference numeral 406 from FIG. 4B), there exists the potential that these types of errors will be read differently during distinct DVD read-outs. For example, assume a pulse-width, $d_i$=3.501 clock cycles. A DVD player could read this pulse-width as 2 or 3 zeroes in different read-outs. Clearly only one of the values is correct, whereas the other one is erroneous. Since this is a probabilistic effort, while both issuing and verifying the errors of the o-DNA, the player can to read the same track several times in order to detect "all errors." It can be reasonably reliable to assume that reading the desired set of tracks from the optical media instance, say, 10 times should be sufficient to detect most errors in that region.

In accordance with an aspect of the claimed subject matter, the verification component 908 can verify the authenticity of an optical media instance based upon the following acts:

I. Verifying that the in-field disc is the same as the one that was issued—here errors from the o-DNA signature 906 can be extracted and the verification component 904 can establish that $|E_M \cap E_T| > \alpha |E_M|$, where $E_M$ can represent a set of errors signed during o-DNA issuing, $E_T$ can be a set of errors extracted in-field, operator |•| can return the cardinality of an argument set, and α can be a real positive scalar less than but close to 1.

II. Verifying that $E_T$ does not have too many errors—although unlikely, it may be possible for a counterfeiter can imprint $E_M$ during an adversarial effort and thus create a match in I. supra. However, the adversary cannot control the manufacturing process to the extent to prevent additional expected manufacturing errors. Therefore, the expectation is that the adversary will have approximately $|E_M|$ additional errors on the counterfeited disc. Thus, the verification component 904 can check whether $|E_M| < |E_M| (1+\beta)$, where β can be a real positive scalar less than but relatively close to 1 (e.g., β=0.8).

Based upon the provided detector description, one can compute the probabilities of false positives and false negatives for a given α and β. Assuming that there is no adversarial attack, the probability of a false positive is practically equal to zero even for relatively small $|E_M|$.

In many scenarios, one of the important features of a successful COA system is robustness to wear and tear. In the case of the o-DNA signature 906, the demand for robustness can, e.g., affect test II. For example, scratches and other surface scuffs can cause additional errors but rarely affect existing errors on the disc.

It can be important that the cardinality of the set of additional errors due to wear and tear, $E_S$, is not greater than $\beta|E_M|$—in the opposite case, the verification component 904 would report false negatives. As presented earlier, false negatives generally do not represent a significant threat to the ecosystem as the counter-piracy activity can be dependent upon an aggregation of responses from a particular vendor. Even so, it is still possible to observe the increase in $|E_S|$ as optical discs get scratched, which is detailed in connection with FIG. 10.

FIG. 10 provides an exemplary table that illustrates error scanning results obtained from reading errors from four different optical media instances with three different types of contents. For example, the contents of Disk 1 was an IDE suite; for Disk 2, an operating system; and for Disk 3, a business suite. Each of the disks was scratched three times: first, only slightly—this level resembles normal use of DVDs discs with software on them; second, somewhat strongly—this level resembles heavy usage of software or music and video DVDs; and third, severely so that the data could not be read from the tests disks. The results indicate that normal heavy usage rarely doubles the number of errors on a disk. Hence, proving efficient the assumption about the verification step II. It is to be understood that the solution to this issue is strictly technological, as several scratch resistant materials are available that could greatly improve robustness to wear and tear for o-DNA-based.

When implementing o-DNA-based optical media distribution systems, system designers can chose $|E_M|$ by reading errors from a desired part of the optical media. Here $|E_M|$ can be balanced by the following properties: one would want large $|E_M|$ because of improved security, reliability, and error rates. In contrast, one would want relatively small $|E_M|$ for a smaller footprint of the o-DNA signature on the optical media instance and shorter error read-time both during issuing and verification. At an error rate of 0.014%, an error read-out at 24 mm during even a single revolution of a DVD, is sufficient to produce $|E_M|$>100. The resulting o-DNA signature stored back onto the DVD would be about 850-bits long. Since the disk encounters 24 revolutions per second at 1× playback speed, one can observe that significantly larger $E_M$ sets could be easily considered in realistic systems of conventional functionality.

Figure 11:
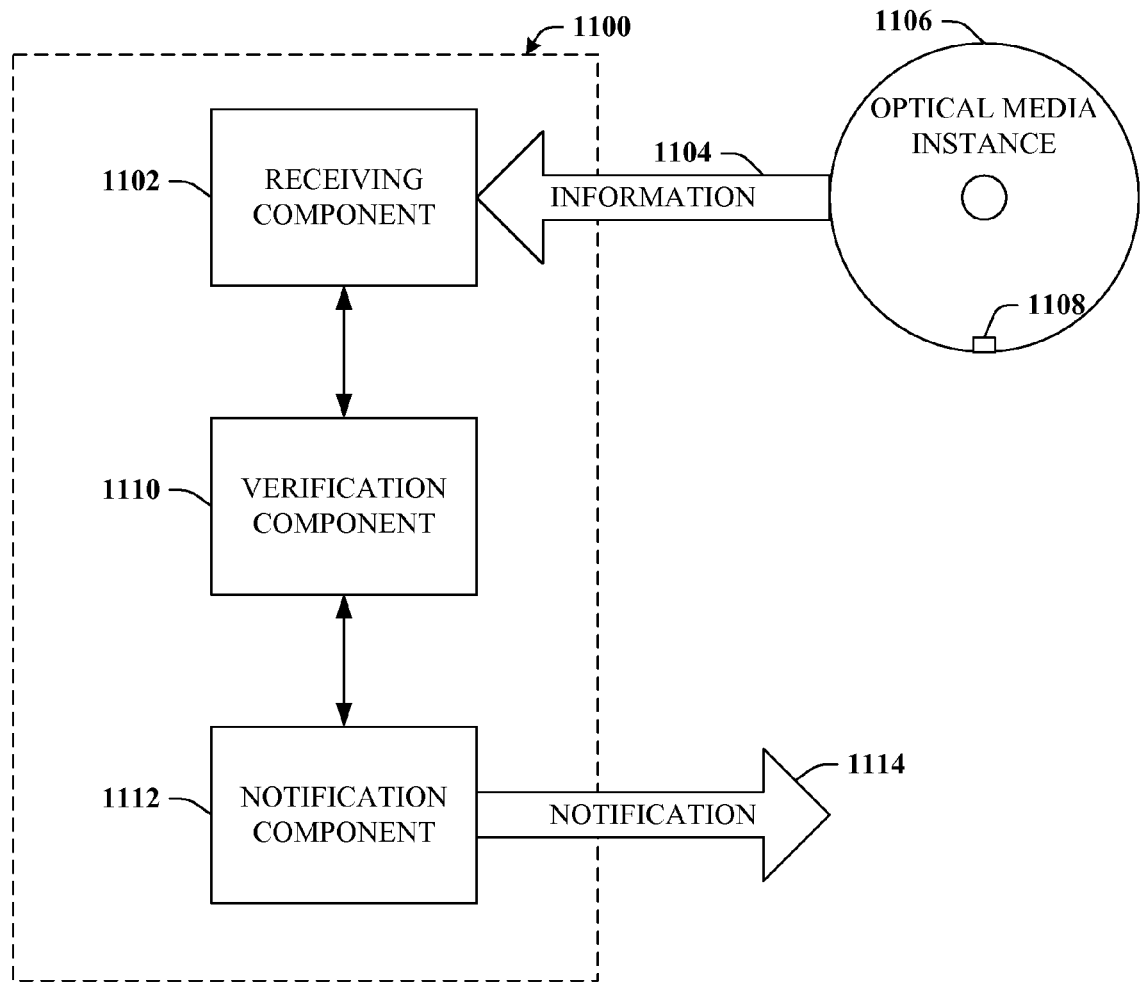
FIG. 11 illustrates a block diagram of an exemplary system that can facilitate and provide notifications.

Turning now to FIG. 11, an exemplary system 1100 that can facilitate and provide notifications is illustrated. Generally, the system 1100 can include a receiving component 1102 that can receive information 1104 from an optical media instance 1106 with an o-DNA signature 1108. The information 1104 can include, e.g. error data associated with manufacturing errors of the optical media instance 1106 as well as the o-DNA signature 1108. The system can also include a verification component 1110 that can compare the error data with the o-DNA signature 1108 to determine whether the optical media instance is authentic as substantially described supra in connection with FIG. 9.

In addition, the system 1110 can include a notification component 1112 that can transmit a notification 1114. The notification component 1112 can transmit a different notification 1114 depending upon a context. For example, as detailed supra in relation to FIG. 3, the o-DNA signature can include a tag. Thus, in accordance with an aspect of the claimed subject matter, the notification 1114 can include information associated with the tag and the notification component 1112 can transmit such information to, e.g., a display such as a monitor or a television coupled to an optical media player.

In accordance with another aspect, the notification 1114 can relate to a determination by the verification component 1110 that the optical media instance 1106 is not authentic. For example, as described in connection with FIG. 9, when an optical media instance is deemed to be a counterfeit (e.g., true negative scenario or false negative scenarios), then an issuer and/or rights-holder can be notified. In accordance therewith, the notification component 1112 can transmit relevant data (e.g., notification 1114) to the rights-holder. In addition, the notification component 1112 can also, e.g., as a prerequisite generate a display informing a user that the optical media instance 1106 is not authentic along with a request for permission to transmit the information to the issuer and/or rights-holder.

Figure 12A:
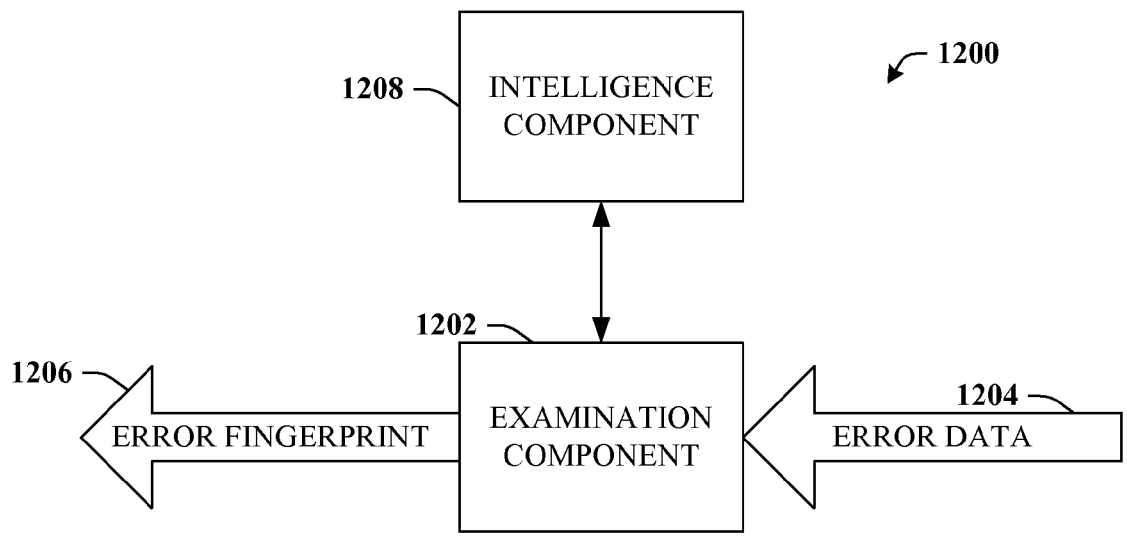
FIGS. 12A and 12B illustrate a block diagram of exemplary systems that include an intelligence component.
Figure 12B:
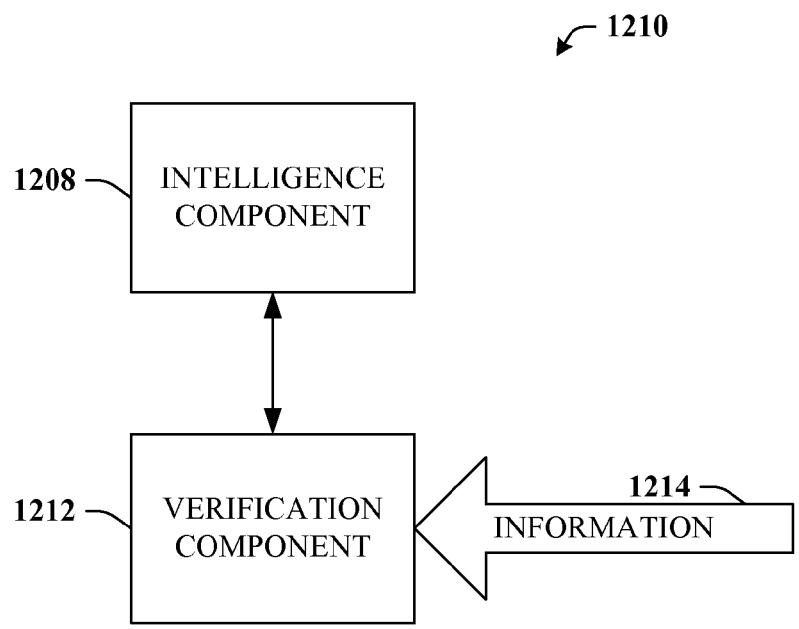

With reference now to FIGS. 12A and 12B, systems 1200 and 1210, respectively, that can facilitate authentication of optical media are depicted. System 1200 displays an examination component 1202 that receives error data 1204 and constructs an error fingerprint 1206 in a manner substantially similar to that described with reference to FIGS. 1 and 3.

System 1210 illustrates a verification component 1212 that can receive information 1214 such as an o-DNA signature and error data from an optical media instance in a manner substantially similar to the description accompanying FIG. 9. Both systems 1200 and 1210 can include an intelligence component 1208. Typically, the intelligence component 1208 can aid in various determinations or inferences. For example, the intelligence component 1208 can interact with the examination component 1202 to, e.g. assist in optimization/compression of the error fingerprint 1206. Likewise, the intelligence component 1208 can interface with the verification component 1212 to, e.g., aid in resolving non-integer pulse-width readouts.

However, it is to be appreciated that the aforementioned functions are merely exemplary, and the intelligence component 1208 can perform a variety of other suitable function, all of which deemed to be applicable to the claimed subject matter. In particular, the intelligence component 1208 can examine the entirety or a subset of the data available and can provide for reasoning about or infer states of the system, environment, and/or user from a set of observations as captured via events and/or data. Inferences can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g. a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system comprising:
an examination component configured to:
receive intrinsic error data for an optical media instance that has a plurality of extant manufacturing errors, wherein the plurality of extant manufacturing errors cause illegal codewords to be read from the optical media instance and the intrinsic error data identifies positions where the illegal codewords are read from the optical media instance; and
construct an error fingerprint of the optical media instance by encoding at least some of the positions where the illegal codewords are read from the optical media instance, the error fingerprint being constructed using an error model reflecting probabilities of reading the illegal codewords from the optical media instance;
an issuing component configured to generate a signature for the optical media instance based at least in part upon the error fingerprint constructed using the error model, the error fingerprint serving as a certificate of authenticity of the optical media instance when verified or vouched for by the signature;
an impression component configured to embed, in the optical media instance, the signature that is based at least in part upon the error fingerprint constructed using the error model; and
one or more hardware processors configured to implement the examination component, the issuing component, and the impression component,
wherein, to generate the signature, the issuing component is further configured to:
concatenate the error fingerprint with a tag to obtain a concatenation of the error fingerprint and the tag, and cryptographically sign a hash of the concatenation of the error fingerprint and the tag.

2. The system of claim 1, wherein the tag comprises a product ID associated with content stored in the optical media instance.

3. The system of claim 1, wherein the tag comprises an expiration date of the signature.

4. The system of claim 3, wherein the issuing component is further configured to cryptographically sign the hash with a private key to generate the signature, the private key having an associated public key usable to verify the signature.

5. The system of claim 1, wherein the tag specifies a geographic region.

6. The system of claim 1, wherein the intrinsic error data used by the examination component to construct the error fingerprint is readable by conventional consumer-grade media players.

7. The system of claim 1, wherein the optical media instance is a Compact Disc or a Digital Versatile Disc.

8. A method performed using one or more hardware processors executing instructions, the method comprising:
receiving error data reflecting manufacturing errors on an optical media instance, wherein the manufacturing errors cause illegal codewords to be read from the optical media instance and the error data identifies error positions where the illegal codewords are read from the optical media instance;
constructing an error fingerprint of the optical media instance by encoding at least some of the error positions where the illegal codewords are read from the optical media instance, the error fingerprint being constructed using an error model reflecting probabilities associated with reading the illegal codewords from the optical media instance;
concatenating the error fingerprint with a tag to obtain a concatenation of the error fingerprint and the tag;
hashing the concatenation of the error fingerprint with the tag to obtain a hash of the concatenation of the error fingerprint and the tag;
cryptographically signing the hash of the concatenation of the error fingerprint with the tag to generate a signature for the optical media instance, the signature serving to authenticate the optical media instance; and
embedding the signature in the optical media instance.

9. The optical media instance produced by the method of claim 8 having the embedded signature thereon.

10. The method of claim 8, wherein the signature is embedded in the optical media instance as part of a post-production process.

11. The method of claim 8, further comprising generating the error model by modeling a random variable representing a distance between signal floor changes relative to a master clock cycle of an optical media reader.

12. The method of claim 8, wherein the tag specifies an expiration date associated with a digital certificate.

13. The method of claim 8 wherein the tag identifies a product identification associated with data included on the optical media instance.

14. The method of claim 8, wherein the error fingerprint is constructed such that the error fingerprint reflects only individual manufacturing errors within a given distance of other individual manufacturing errors and at least some further manufacturing errors on the optical media instance are excluded from the error fingerprint.

15. The optical media instance produced by the method of claim 14 having the embedded signature thereon, wherein the embedded signature identifies only the individual manufacturing errors that are within the given distance of the other individual manufacturing errors and does not identify the at least some further manufacturing errors on the optical media instance are excluded from the error fingerprint.

16. A computer-readable memory device or storage device comprising instructions which, when executed by a processor, cause the processor to perform acts comprising:
receiving error data reflecting manufacturing errors in an optical media instance, wherein the manufacturing errors cause illegal codewords to be read from the optical media instance and the error data identifies error positions where the illegal codewords are read from the optical media instance;
constructing an error fingerprint of the optical media instance by encoding at least some of the error positions where the illegal codewords are read from the optical media instance, the error fingerprint being constructed using an error model reflecting probabilities of reading the illegal codewords from the optical media instance;
concatenating the error fingerprint with a tag to obtain a concatenation of the error fingerprint and the tag;
hashing the concatenation of the error fingerprint and the tag to obtain a hash of the concatenation of the error fingerprint and the tag;
generating a signature for the optical media instance by cryptographically signing the hash of the concatenation of the error fingerprint and the tag, wherein the error fingerprint serves as a certificate of authenticity verified or vouched for by the signature; and
embedding the signature in the optical media instance.

17. The computer-readable memory device or storage device of claim 16, wherein:
the optical media instance comprises a plurality of first symbols encoded in a first alphabet that are converted by a codec to a plurality of second symbols of a second alphabet, and
the act of receiving the error data comprises receiving at least some error positions where certain symbols that are not part of the first alphabet are read from the optical media instance.

18. The computer-readable memory device or storage device of claim 17, wherein:
the plurality of first symbols of the first alphabet are 16-bit symbols and the plurality of second symbols of the second alphabet are 8-bit symbols, and
the act of constructing the error fingerprint comprises encoding an individual error position that does not include any of the 16-bit symbols of the first alphabet.

19. The computer-readable memory device or storage device of claim 17, wherein the act of receiving the error data comprises reading the illegal codewords using a non-return to zero, inverted technique.

20. The computer-readable memory device or storage device of claim 16, the acts further comprising:
signing the hash of the concatenation of the error fingerprint and the tag with a private key to generate the signature, the private key being associated with an issuer of the optical media instance.

21. A system comprising:
a hardware processor; and
one or more computer-readable storage devices comprising computer-executable instructions which, when executed by the hardware processor, cause the hardware processor to:
receive error data reflecting manufacturing errors in an optical media instance, wherein the manufacturing errors cause illegal codewords to be read from the optical media instance and the error data identifies error positions where the illegal codewords are read from the optical media instance;
construct an error fingerprint of the optical media instance by encoding at least some of the error positions where the illegal codewords are read from the optical media instance, the error fingerprint being constructed using an error model reflecting probabilities associated with reading the illegal codewords from the optical media instance;

concatenate the error fingerprint with a tag to obtain a concatenation of the error fingerprint and the tag;

perform a hashing operation on the concatenation of the error fingerprint and the tag to obtain a hash of the concatenation of the error fingerprint and the tag;

generate a signature for the optical media instance by cryptographically signing the hash of the concatenation of the error fingerprint and the tag, the signature serving to authenticate the optical media instance; and embed the signature in the optical media instance.

22. The system of claim 21, wherein the computer-executable instructions further cause the hardware processor to construct the error fingerprint such that the error fingerprint reflects only individual manufacturing errors within a given distance of other individual manufacturing errors and at least some further manufacturing errors on the optical media instance are excluded from the error fingerprint.

23. The system of claim 21, wherein the computer-executable instructions further cause the hardware processor to compress the at least some of the error positions where the illegal codewords are read from the optical media instance to construct the error fingerprint.

* * * * *